INVENTOR.
SIDNEY BERTRAM
BY Fraser and Bogucki
ATTORNEYS

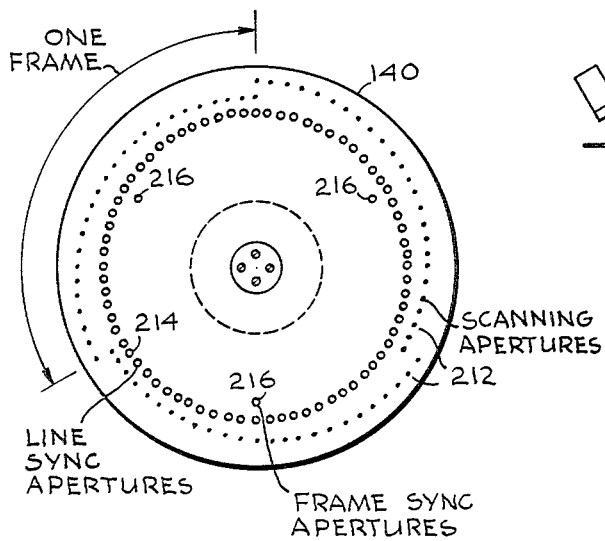
Fig. 9
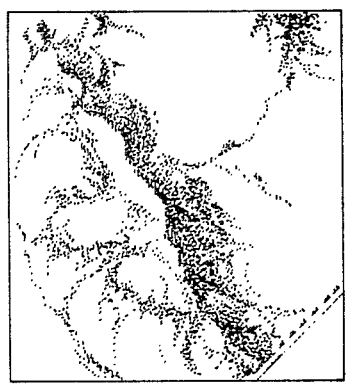
Fig. 4
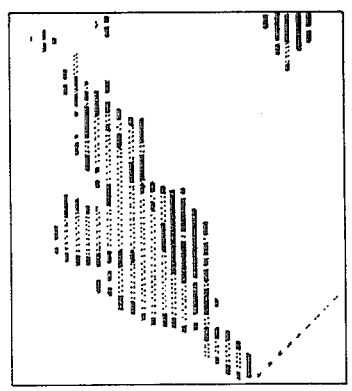
Fig. 5
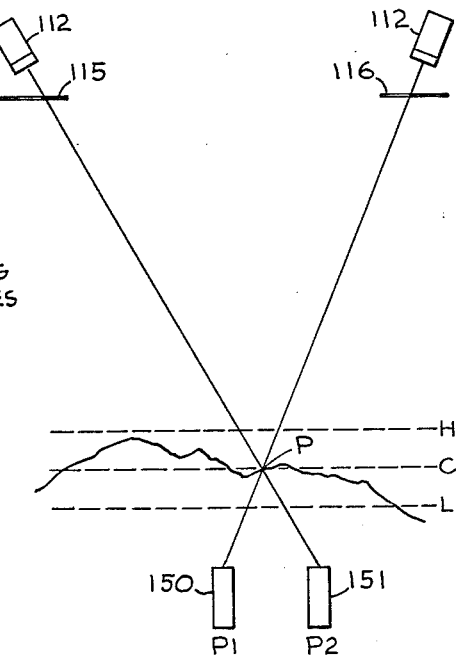
Fig. 11
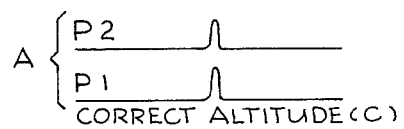
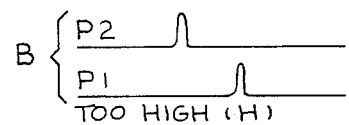
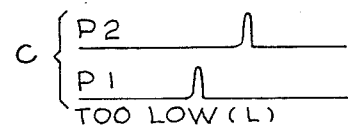
Fig. 12
SIDNEY BERTRAM
INVENTOR.
BY Fraser and Bogucki
ATTORNEYS

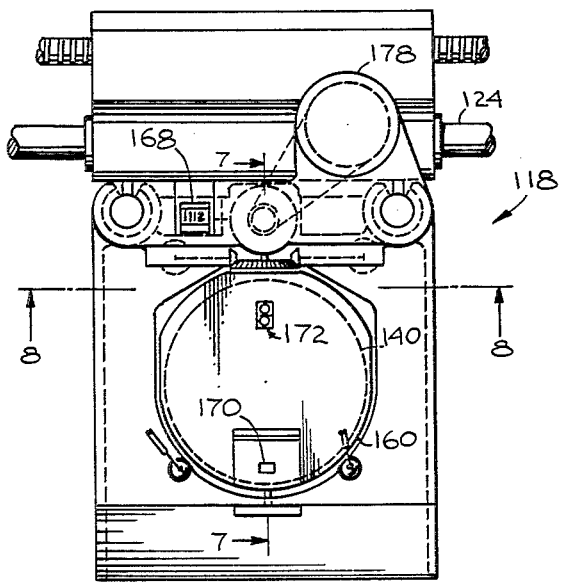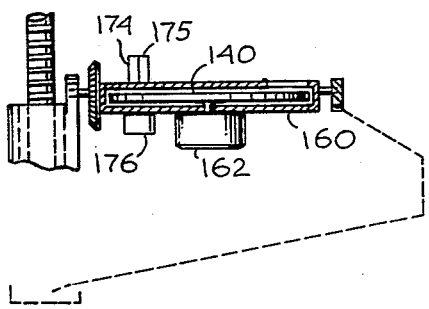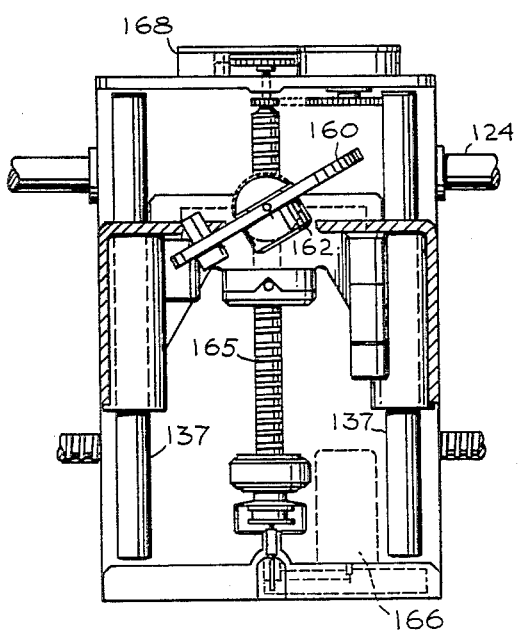

SIDNEY BERTRAM
INVENTOR.

SIDNEY BERTRAM
INVENTOR.

BY Fraser and Bogucki
ATTORNEYS

United States Patent Office 3,473,875
Patented Oct. 21, 1969

3,473,875
AUTOMATIC STEREOMAPPING SYSTEM
Sidney Bertram, Los Angeles, Calif., assignor to The Bunker-Ramo Corporation, Canoga Park, Calif., a corporation of Delaware
Continuation of application Ser. No. 199,797, June 4, 1962. This application Aug. 17, 1967, Ser. No. 661,466
Int. Cl. G01c 11/12; H01j 39/12
U.S. Cl. 356—2                                                    19 Claims

ABSTRACT OF THE DISCLOSURE

An automatic stereomapping system for deriving topographical information from a stereoscopic image produced by the superposed projections of two photographs of the same terrain taken from slightly different angles. A scanner including a Nipkow disk controllable in X, Y and Z coordinates provides line scanning for deriving video information on an incremental basis over the extent of the stereo image. Dead-time compensation means are employed to replace the unwanted transient video signals occurring between scan lines with signals more closely approximating the video signals obtained during normal line scanning. The resulting compensated video signals are then applied to a correlator for deriving error signals which are used to automatically control the elevation and tilt of the scanner in accordance with the elevation and slope of the stereo image. A photographic printer is coupled to the scanner for automatically producing on respective cathode ray tubes an orthographic reproduction and an altitude profile chart of the stereoscopic image.

---

The present application is a continuation of copending application Ser. No. 199,797, filed June 4, 1962, and now abandoned, by Sidney Bertram and assigned to the same assignee as the present invention.

This invention relates to automatic profiling systems and more particularly to arrangements for automatically following the surface of a projected stereoscopic image.

There are a number of seemingly unrelated fields which share a common problem, that of deriving or transferring information relating to the three-dimensional aspects of particular contours. Some obvious examples may be found in the fields of map making, surveying, machine tool control, pattern and die making, and highway construction, to name a few. In the case of some of these examples, automatic reproduction techniques have been employed which control a copying or recording mechanism from the contour of an actual model. This, of course, is not feasible in other fields, such as map making, in which the requisite information cannot be derived automatically from the actual terrain with any degree of practicality. Even in those cases where previously known automatic reproduction techniques are feasible, they are generally limited by some kind of direct coupling between the contour model and the copying or recording mechanism. In any case the known reproduction techniques may be considerably improved, with resulting substantial savings of time, effort, money, and equipment required, through resort to photographic reproduction of the particular contour with respect to which information is desired, provided there is some system for simply, precisely, and automatically deriving the desired information from a corresponding projected stereoscopic image of the original contour.

The present invention constitutes such a system. The need for such a system has been particularly acute in the area of map making, since, although obtaining the desired information through the use of land surveying techniques is laborious, costly and time-consuming at best (and may be virtually impossible in particularly inaccessible regions of the earth), aerial photographs may be provided within a relatively short time of practically any point on the globe. The development of aerial cameras and the improved techniques of aerial photography has proceeded to a point where the resulting photographs contain the desired detail, even though they may have been taken from positions miles above the earth. Therefore the present invention is specifically directed to deriving the desired terrain altitude and image information from a stereoscopic image resulting from the superposed projections of two such photographs of the same terrain taken from slightly different angles. Accordingly, the present invention will be described in the context of this particular application. It should be borne in mind, however, that the principles of the present invention are generally applicable in situations where a projected stereoscopic image may be made available as a source of the desired contour information and are not limited to the specific field of map making, with relation to which the present invention will be described.

In the field of aerial surveying, that is, determining the terrain characteristics of a given land area, it has been possible to develop satisfactory maps from photographs taken from an airplane flying over the particular region. Using the resulting photographs in stereoscopic pairs suitably positioned in special plotting apparatus, such as a Kelsh plotter, skilled operators have been able to determine the elevation of each point in the depicted terrain and to construct the corresponding map showing the various details of interest and the contour lines indicating the various elevations. It is possible to produce a composite photographic map through the use of known projection apparatus, such as a Kelsh plotter, so that some of the errors of tilt and distortion which exist in the individual aerial photographs are compensated for. There have even been developed particular arrangements which, although cumbersome at best, may be used by an operator to produce a photographic map with superposed contour lines from original aerial photographs. A good general description of known methods for producing maps of the type described may be found in Patent 2,811,445 granted Oct. 29, 1957.

While the above-cited patent is useful for the details involved in previously known photogrammetric processes, it may be well to set forth briefly the general principles involved. In the operation of the conventional Kelsh plotter, a series of photographic diapositives, that is, transparencies usually printed on glass plates, are made from the aerial photographs which were previously taken on specific flight lines over the terrain being surveyed. The aerial photographs are arranged to provide about sixty percent overlap along the line of flight. Thus each pair of adjacent photographs, or the corresponding diapositives developed therefrom, is capable of generating a stereoscopic image of a portion of the terrain. A pair of these diapositives are placed in the projection apparatus of the Kelsh plotter and suitably disposed with respect to each other, through resort to known bench marks in the photographs. The process of setting up the diapositives in the Kelsh plotter so as to generate the suitable stereoscopic image providing proper image registration at particular points of known elevation is known as "orienting the model." It involves establishing the appropriate spatial relationships of the respective diapositives as well as establishing the appropriate angle between the two. When it is completed, the positions of the two diapositives bear the same relationship on a reduced scale as the respective positions of the airplane at the times the photographs were taken. The scale of the model may be adjusted as desired by varying the distance between the projectors.

A small test surface is then placed in the field of the projected stereo image so that the surface is at the apparent elevation of the particular portion of the image, thus providing a measure of the altitude of the terrain corresponding to the image. The test surface is adjusted to a given elevation value and then moved over the field of the projected stereo image to determine the contour line for the elevation value. The operator then utilizes this information to develop the desired contour map.

It should be obvious that the process just described is necessarily slow and laborious and subject to the errors which are normally inherent in the use of apparatus depending upon human operators. Furthemore, it can be seen that the greater the detail which is desired from such a process, the slower and more precise the operator must be. Clearly, a more satisfactory solution to the problem of providing appropriate maps from aerial photos (and, in general, deriving terrain altitude information from a projected stereoscopic image) is desirable.

It is a general object of the invention to provide a system for automatically deriving altitude information from stereo photographs.

It is also an object of the invention to provide an improved system for developing maps from aerial photos.

More specifically, it is an object of this invention to achieve a system which is capable of providing suitable terrain altitude and image information from aerial photos automatically.

A further object of the invention is to provide an orthophoto wherein image elements of the photographic information in the photographs are printed in orthographic projection.

It is a still further object of the invention to develop from a single operation of a stereoscopic projection process both on orthographic photomap and a corresponding incremental elevation chart without loss of the detail which is present in the original aerial photographs.

In brief, the system of the present invention is utilized to produce photographically an orthophoto, which is an orthographic projection of the area showing all the photographic detail, and an altitude drop-line chart, which provides the desired elevation information, from an automatically controlled stereomapping process. In this application the term "stereomapping" will be used in preference to the term "photogrammetry" as being more representative of the process involved.

In one particular arrangement in accordance with the invention, a modified Kelsh plotter is employed to develop the desired projected stereoscopic image. A pair of diapositives corresponding to particular aerial photographs is placed in the projection apparatus and light is directed therethrough to develop the corresponding stero image. In accordance with known procedures for the use of a Kelsh plotter as already mentioned above, the model is oriented and scaled to correspond to the actual terrain of the photographs.

In this arrangement of the invention, the known Klesh plotter apparatus is modified by replacing the conventional means defining the aforesaid test surface with a precision scanning apparatus such as a Nipkow disk, which is a rotating disk having a series of apertures arranged in the form of a spiral around the circumference in order to achieve mechanical scanning of a given field of view. Mechanisms are also provided to control the motion of the Nipkow disk in the X, Y and Z (Cartesian coordinate) directions. The Nipkow disk is therefore employed as the test surface and is moved over the extent of the area being mapped in a selected traverse. As it is moved, the disk is rotated to scan the particular incremental area in its field of view. A pair of photomultiplier tubes are disposed beneath the Nipkow disk in order to receive the light from the respective diapositive image projectors as modulated by the disk.

In accordance with various aspects of the invention, the resulting video signals from the photomultiplier tubes are utilized to develop control signals for servomotors which are arranged to adjust the elevation, or Z-axis position, and, in one form of the invention, the tilt of the Nipkow disk is also controlled in a manner tending to maintain a desired degree of correlation between the signals delivered by the photomultiplier tubes at every point of the traverse of the scanning disk over the area being mapped. In accordance with one aspect of the invention, the respective signals from the photomultipliers are correlated through the use of suitable delay networks feeding multiplying type correlation circuitry and then compared against each other to provide an appropriate error signal which is indicative of degree and direction of deviation of the scanning disk from the proper position corresponding to the particular incremental image area being scanned. In accordance with another aspect of the invention, the video signals from the photomultipliers are similarly correlated and compared with each other over half line scan intervals, as established by the Nipkow disk, in order to develop an error signal which is indicative of deviation from proper tilt corresponding to the slope of the incremental image areas. The elevation error signals and tilt error signals thus developed are used to control the Z axis servomotor and tilt servomotor respectively, so that optimum correlation of the photomultiplier signals may be achieved for any given point on the stereo model surface, thus enabling the scanning apparatus to follow the surface of the projected image automatically. In addition to their use in the development of appropriate error signals for the control of the Nipkow scanning disk, the signals from the photomultipliers may be employed on an alternative basis to furnish the video information which is utilized in printing the orthophoto.

In accordance with a further aspect of the invention, a signal indicative of the degree of tilt of the Nipkow scanning disk is employed to select between the photomultiplier signals which are fed to an associated orthophoto print-out mechanism so that the better and more accurate signal of the two available is always used for printing out the resulting orthophoto. The corresponding altitude dropline or elevation indication chart is printed in response to signals derived from the position of the Nipkow disk suspension mechanism with respect to the pair of diapositives as the entire apparatus traverses the area being mapped.

In accordance with a further aspect of the invention, the altitude drop-line chart is printed utilizing a marking code of at least three code elements in a selected repetitive or rotary sequence so that the direction of elevation change may be ascertained as well as the fact that an elevation change has occurred. In this manner, it is easy to ascertain which of two adjacent but different elevation intervals is above the other. In the described embodiment of the invention, the altitude drop-line chart is printed in three different shades, black, gray and white, and the resulting chart comprises a series of lines, each being modulated in the respective shades to indicate the various elevation intervals. It thus becomes a simple matter to derive the elevational contour lines from the altitude drop-line chart by connecting the boundaries of adjacent regions of given elevation intervals, and a superposition of the contour lines on the corresponding orthophoto produces an effective topographic map.

Considered in somewhat greater detail, the positioning apparatus for the scanning mechanism of the present invention utilizes a linear reciprocating drive to produce back and forth motion of the scanning mechanism in the Y dimension. In this arrangement, the Y dimension is at right angles to the direction of flight of the aircraft taking the aerial photographs and is in the plane of the orthographic projection, which in the usual case is a horizontal plane. The motion of the scanning mechanism in the X direction is achieved by a stepping motor which is energized at each termination of a Y directed motion across the stereo field so that in operation, the scanning mechanism is carried across the area being traversed, is moved by a selected incremental distance in the X direction, is carried back and moved over another incremental X distance and the process repeated until the entire area is traversed. Both the rate of traversal in the Y direction and the incremental distance stepped in the X direction are adjustable in order to provide any degree of accuracy or exactness in compilation which may be desired.

While it is being moved across the area of interest in this fashion, the Nipkow disk is driven to scan the incremental area of the stereo image within its field of view on a line by line basis. For this purpose, a plate with a small window defining the field of view is positioned adjacent the Nipkow disk so that the individual apertures in the Nipkow disk achieve a line by line scan of the particular frame which is defined by this window. As this window is transported about the stereo model, the scanning lines defined by the individual apertures in the rotating Nipkow disk are substantially perpendicular to the instantaneous direction of travel of the window in the Y direction; thus the frame defined by the moving window is scanned on a line by line basis with the individual lines being arrayed in the X direction.

With this type of arrangement, it is impractical to change from one scanning aperture to the next in the Nipkow disk with perfect smoothness. If the apertures are sufficiently close together so that there is a slight overlap with one aperture entering the field of view slightly before the preceding one leaves the field, there is a momentary increase in the amount of light passed through the disk to the photomultipliers beneath. Conversely, if the scanning apertures are positioned slightly farther apart so that there is no overlap, a brief interval results in which there is an interruption of the light signal transmitted to the photomultipliers, since each scanning aperture leaves the field of view slightly before the succeeding aperture enters the field. In any event there occurs a serious disruption, or unwanted transient, in the light signal presented to the photomultipliers during the so-called "dead-time" at the end of each line scan. This transient which occurs at a predictable point in a line scan interval bears no relationship to the useful video signals from the photomultipliers and thus interferes with the correlation process unless compensated for. In order to prevent the corresponding disruption of the photomultiplier signals which are utilized in correlation, there is provided in accordance with a further aspect of the invention a dead-time compensator circuit for not only eliminating this disturbance during the dead-time interval but, in addition, for maintaining a signal level which is related to the average video signal level developed over a selected portion of the previous line scan so that a smooth transfer from one line scan to the next may occur. The utility of the dead-time compensator circuit is not limited to the system of the present invention but it is also of interest in any system which employs scanner-derived information which is applied to a comparison type device.

In particular portions of the described arrangement in accordance with the invention wherein error signals for controlling the elevation and tilt of the Nipkow disk are developed, a pair of multiplying type correlation channels are provided. In one of these channels signals from a first photomultiplier tube are fed directly to a correlator while signals from a second photomultiplier tube are delayed by an amount which is related, in accordance with one particular aspect of the invention, to the rate of scanning of the Nipkow disk and to the degree of altitude control desired before application to the same correlator as the signals from the first photomultiplier tube. In the other channel the situation is reversed; that is, signals from the second photomultiplier tube are fed directly to the correlator while signals from the first photomultiplier are delayed by a predetermined amount before being applied to the correlator. The resulting correlation output signals are compared with each other by switching between them synchronously with a servo power line to develop a corresponding height error signal suitable for driving the servomotor which controls the elevation of the Nipkow disk. A similar correlating arrangement is utilized in accordance with an aspect of the invention to develop a tilt error signal by, in effect, comparing the height error signals for different portions of the same line scan. The tilt error signal is then used to drive the Nipkow disk tilt servomotor.

In addition to the correlators employed for developing the respective error signals, a further correlator is arranged for receiving signals from the photomultipliers and for comparing these signals to develop an indication of the degree of correlation between the signals. The output of this correlator is applied, in accordance with an aspect of the invention, to the scanner control circuits so that, as the degree of correlation of the video signals decreases, the speed with which the scanner traverses the stereo image may be reduced. Thus the ability of the scanner to follow poorly defined terrain is enhanced. The correlator output signal thus derived is also applied, together with a signal from the height error correlator, to a threshold circuit which is arranged to interrupt the automatic scanning and sound an alarm in the event of either a large elevation error or a very poor degree of correlation between the video signals which would indicate that the scanner is not tracking properly.

The print-out portion of the stereomapping system includes a pair of cathode-ray tubes with associated optical systems for printing upon a pair of photographic films. The print-out cathode ray tubes are moved across the photographic films in correspondence with the motion of the Nipkow scanner in its traversal of the stereoscopic image being reproduced. There is thus provided for this purpose a second servo positioning system which is not to be confused with the servo system employed for controlling the elevation and tilt angle of the Nipkow disk.

A better understanding of the invention may be had from a consideration of the following detailed description, taken in conjunction with the accompanying drawings, wherein like reference numerals are employed to refer to like elements and in which:

FIG. 4 is a sketch representing a portion of a particular orthophoto which may be produced by the system of the invention;

FIG. 5 is a sketch representing a portion of a particular altitude drop-line chart produced by the system of the invention in correspondence with the orthophoto of FIG. 4;

FIG. 6 is a plan view showing the scanner employed in the mechanism of FIG. 1;

FIG. 7 is a sectional view of the scanner of FIG. 6 taken along the line 7—7;

FIG. 8 is a sectional view of the scanner of FIG. 6 taken along the line 8—8;

FIG. 9 is a view of a Nipkow scanning disk employed in the scanner of FIG. 6;

FIG. 11 is a diagram presented to demonstrate the method of sensing elevation error in the arrangement of FIG. 1;

FIG. 12 represents waveforms corresponding to different elevations represented in FIG. 10;

Figure 1:
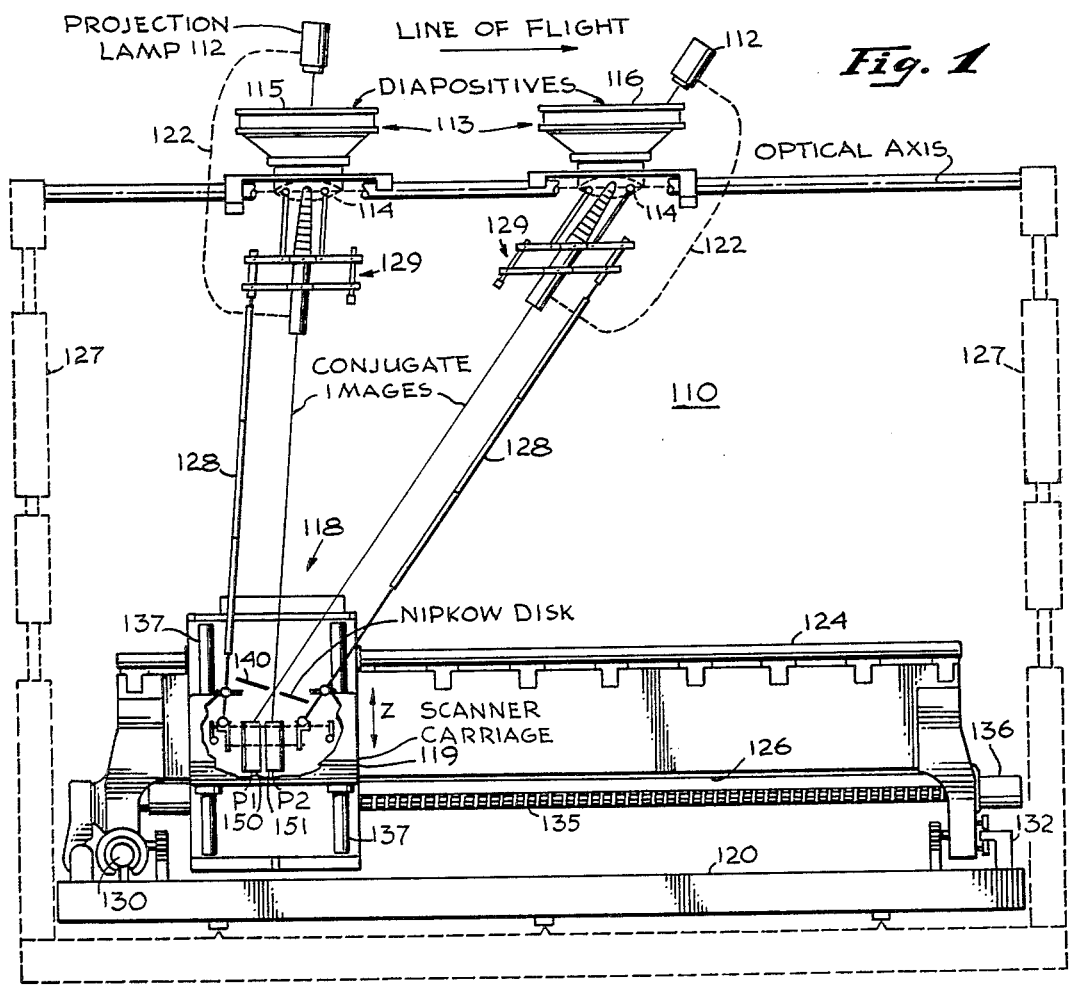
FIG. 1 is a front elevational representation of significant portions of a modified Kelsh plotter which is employed in the system of the present invention.
Figure 2:
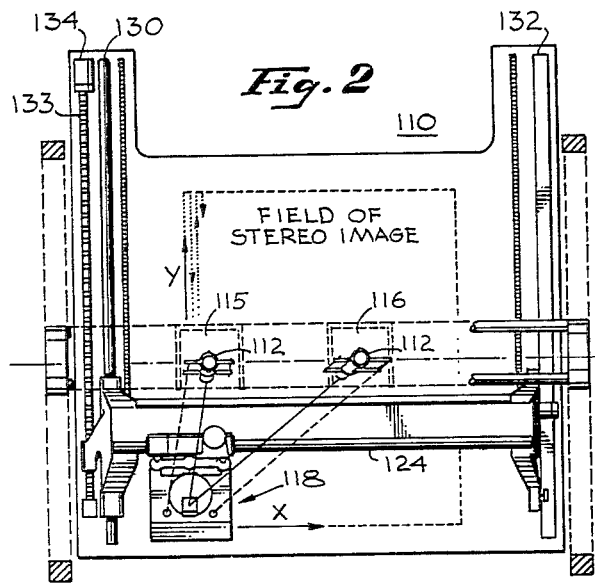
FIG. 2 is a plan view representing the modified Kelsh plotter shown in FIG. 1 and indicating the mode of traverse of the scanning mechanism.

In the arrangement shown in elevational and plan views in FIGS. 1 and 2 respectively, a Kelsh plotter 110 is depicted as modified to operate in the system of the present invention. The modified Kelsh plotter 110 basically comprises a pair of light sources 112, light imaging mechanisms 113 including lenses 114, a pair of diapositives 115 and 116 positioned on the mechanisms 113, a scanner 118, and a base, or bed, 120 on which the entire apparatus is mounted. Support members 127 of the frame are indicated generally and may be of any suitable configuration. The scanner 118, suspended from a scanner carriage 119, is arranged to be independently movable in three dimensions by means of an X axis guide rail 124 and corresponding way 126, Y axis guide rail 130 and corresponding way 132, and Z axis guide rails 137. It will be understood that the Y axis is represented in FIG. 1 is being perpendicular to the plane of the drawing while the X axis is horizontal and the Z axis is vertical in the plane of the drawing. Suitable suspension arms 122 for the light sources 112 are represented by dashed lines which indicate the general shape of the arms 122. These arms, together with appropriate linkage members 128 and 129, mechanically connect the scanner 118 and the light sources 112, thus causing the various portions of the mechanism to move so that light is always directed at the scanner 118 as the latter is moved over the extent of its traverse. Details of the scanner 118 are shown in FIGS. 6, 7 and 8.

In the operation of the modified Kelsh plotter of FIGS. 1 and 2, a pair of diapositives 115 and 116, corresponding to aerial photographs taken along the line of flight of an airplane, are positioned so as to develop a suitable stereo image or model within the range of the scanner 118. The motion of the scanner along its automatic traverse pattern as indicated in FIG. 2 is then initiated, whereby the scanner 118 moves back and forth along lines perpendicular to the line of flight (along the Y axis), followed by a step over of a preselected interval in the direction of the line of flight (along the X axis) each time the limit of Y traverse is reached. This procedure continues until the entire area of the stereo image has been covered. The described motion is controlled by the Y axis drive screw 133, driven by the Y axis motor 134, and by the X axis drive screw 135, driven by the X axis stepper motor 136. While the scanner 118 is being moved in the horizontal plane in the manner described, it may also move vertically along the Z axis to follow successive profiles of the stereo image.

The scanner 118 includes a Nipkow scanning disk 140 and a pair of photomultiplier tubes 150 and 151, shown in the cutaway portion of FIG. 1. The Nipkow scanning disk 140, together with its associated housing, functions as a test surface in the modified Kelsh plotter 110 and mechanically scans a small incremental area by admitting light from the light sources 112 through succeeding apertures of the Nipkow disk 140 to the photomultiplier tubes 150 and 151. Electrical signals, developed by the photomultiplier tubes 150 and 151 in response to the incident light beams, are analyzed in the system of the invention and are employed to provide video information for the printing of an orthophoto and to develop appropriate error signals for controlling the scanner 118, causing the scanner 118 to assume both the appropriate elevation and tilt corresponding to the incremental area being scanned. Electrical signals developed in accordance with the elevation or Z position of the scanner 118 are then generated to control the printing of an altitude drop-line chart corresponding to the orthophoto which, in accordance with the invention, may be printed concurrently with the printing of the altitude drop-line chart as will be seen more clearly hereinafter.

Figure 3:
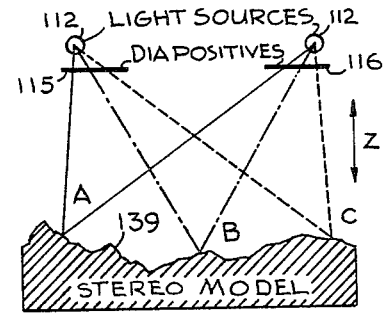
FIG. 3 is a sectional representation of a stereo model optically developed in the plotter of FIG. 1.

The simplified diagram of FIG. 3 is included to assist in the understanding of the operation of the present invention. This diagram portrays a section of a stereo model corresponding to a pair of diapositives 115, 116. It should be borne in mind that the stereo model referred to is simply a projected image; however, it can be most easily understood if it is thought of as an actual model having a three dimensional profile or surface. The profile is determined by the locus of points of registration of the light images projected from the two diapositives 115, 116 over the extent of their overlap. As viewed in this manner, the projected stereo image may be considered to possess a section profile 139 as indicated. This profile 139 is determined by the elevation at which focused image defining portions of the respective light beams transmitted through the diapositives 115, 116 are in registration. Thus, a point A is shown at the left-hand side of FIG. 3 having an elevation corresponding to the point of intersection of the light beams, indicated by the solid lines, which pass through portions of the diapositives 115 and 116 defining the same image detail. Similarly, the points B and C are shown at particular elevations corresponding to the intersections of the light beams, indicated by the dot-dashed and dashed lines respectively, which are directed at those points from the diapositives 115, 116. In each pair of light beams associated with images on the two diapositives from a common terrain point the intersection occurs at a height corresponding to the elevation of the terrain point. The scanning operation achieves a stereo effect by virtue of the geometrical separation of the light from the two projectors to their respective photomultipliers.

It should be noted that the profile 139 (FIG. 3), which is in the X direction, is shown for explanatory purposes only. However, the system as described herein traverses the stereoscopic image by profiling it in the Y direction as shown in FIG. 2.

A portion of a typical orthophoto such as may be printed out in the operation of the system of the invention is represented in FIG. 4. As may be understood from the portion of the orthophoto shown, the photographic details of the original aerial photographs as represented by the two diapositives are reproduced in the orthophoto. In fact, because of the way in which the light intensity and cathode ray tube brightness levels are controlled in the operation of the system of the invention, it is actually possible to construct an orthophoto which points up photographic detail not readily discernible in the original diapositives. In addition, however, since the photographic detail is exposed at a film position corresponding to the actual Cartesian coordinates of the scanner 118, the new photograph appears as a true orthographic projection which depicts image elements therein in true horizontal relationship without distortion due to the angle of viewing.

FIG. 5 depicts a portion of an altitude drop-line chart corresponding to the orthophoto portion of FIG. 4. The section shown in detail in FIG. 5 indicates how the altitude drop lines are depicted in a way which permits contour lines to be readily ascertained. In the particular embodiment of the invention described herein, the altitude drop-line chart indicates changes in elevation by printing in three different line types as may be defined by the shades, white, gray and black, in sequence for a continuing change of elevation. The different elevation are distinguished by being represented in the different shades, with each shade being repeated in sequence. Thus, if for a particular section of the chart a 900–920 foot level (for an elevation interval of 20 feet) is represented by a black line and the sequence of the respective shades occurs in the order, black-gray-white, for increasing elevation, then it is clear that an adjacent gray line represents the 920–940 foot interval while a white line adjacent the gray line representing the 920–940 foot interval represents the 940–960 foot interval. Printing in this fashion not only permits changes of elevation to be readily ascertained but also permits the direction of the elevation change (whether up or down) to be determined. With an altitude drop-line chart printed in this manner and an orthophoto, superposition of contour lines, which are clearly indicated as the boundaries of areas of a given altitude interval on the altitude drop-line chart, upon the orthophoto then produces an effective topographic map.

Although the altitude drop-line chart printed out by the specific embodiment of the present invention is represented as a series of lines in different shades, it should be clear that the principles relating to this aspect of the invention are also applicable to other ways of representing the different elevation intervals. For example, arrangements of different dotted and dashed lines, lines of varying widths, or lines of different colors may be displayed in a code consisting of three or more elements to represent the elevation information in accordance with this aspect of the invention.

Details of the scanner 118 are shown in the respective views thereof in FIGS. 6, 7, and 8. As shown, the scanner 118 comprises a Nipkow scanning disk 140 mounted for rotation within a housing 160. A motor 162 is attached to the housing 160 for driving the Nipkow disk 140. The entire scanning disk mechanism including the housing 160 is movable in the vertical or Z direction by means of the Z axis drive screw 165 and the Z axis motor 166. An indicating counter 168 is coupled to the scanner 118 to provide an indication of the scanner elevation which may be read by the operator. In addition, the Nipkow disk housing 160 is mounted so that it may be tilted about an axis parallel to the Y axis by a servomotor responsive to tilt signals in order to provide better correspondence with the actual terrain in tilted areas of the image. It should be understood that the tilt control of the Nipkow disk is independent of the elevation control of the scanner. In some applications tilt control may not be needed and a simpler arrangement of the invention is feasible.

The scanning disk housing 160 is provided with a pair of windows arranged on opposite sides of the disk 140. One referred to as the scanning window 170, shown at the lower portion of the housing 160 in FIG. 6, serves to define the incremental area of the projected stereo image being scanned at any given instant. The other, designated the sync window 172 and shown in the upper portion of the housing 160 in FIG. 6, is used to generate line and frame sync pulses in conjunction with the Nipkow disk 140 as will be discussed more fully below. These sync pulses are developed by light from a light source 176 passing through the sync window 172 to a line sync photocell 174 and a frame sync photocell 175. As shown in FIG. 1, the light from the diapositives 115, 116 passes through the window 170 and the moving Nipkow scanning apertures in the housing 160 and is directed to the photomultipliers 151 and 150 respectively.

Signals bearing information relating to the elevation of the scanner 118 for use in the printing of the altitude drop-line photo are developed by a contour interval read-out mechanism 178 (FIG. 6) coupled to the scanner 118. Negator springs (not shown) are incorporated in the suspension mechanism of the scanner 118 to counterbalance the weight of the moving elements in order to reduce the torque demand on the Z axis servomotor 166 (FIG. 8) when the scanner 118 is being raised.

FIG. 9 shows a Nipkow scanning disk 140 as utilized in the scanner 118. This particular scanning disk 140 includes a plurality of scanning apertures 212, a like plurality of line sync apertures 214 and a plurality of frame sync apertures 216. As shown, the line scanning apertures 212 are arranged in three groups, one group for each of the frame sync apertures 216. Within an individual group corresponding to one frame, the scanning apertures 212 are displaced at successively smaller radial distances (proceeding clockwise) from the center of the disk. Thus, when the disk 140 is rotated counterclockwise within the disk housing 160 of the scanner 118 (FIG. 6), each scanning aperture 212 passes in turn across the scanning window 170, exposing successive lines of the frame being scanned to the photomultiplier tubes 150, 151. At the same time, light is permitted to pass through the sync window 172 and through the appropriate line sync apertures 214 and frame sync apertures 216 to the corresponding photocells 174 and 175. These photocells and suitable associated circuitry in turn generate appropriate synchronizing pulses which are employed in the processing of the video signals derived from the photomultiplier tubes 150 and 151. In this particular arrangement of the invention, the Nipkow scanning disk is arranged to rotate at 3600 r.p.m. The disk has three groups of scanning apertures so that scanning is achieved at a rate of 180 frames per second. In FIG. 9 each frame is shown comprising 25 lines; however, in one embodiment of the present invention the scanning is performed at a rate of 2700 lines per second with a resolution of 15 lines per frame. The scanning window area is 0.335 inch in the X dimension by 0.092" in the Y dimension.

Figure 10:
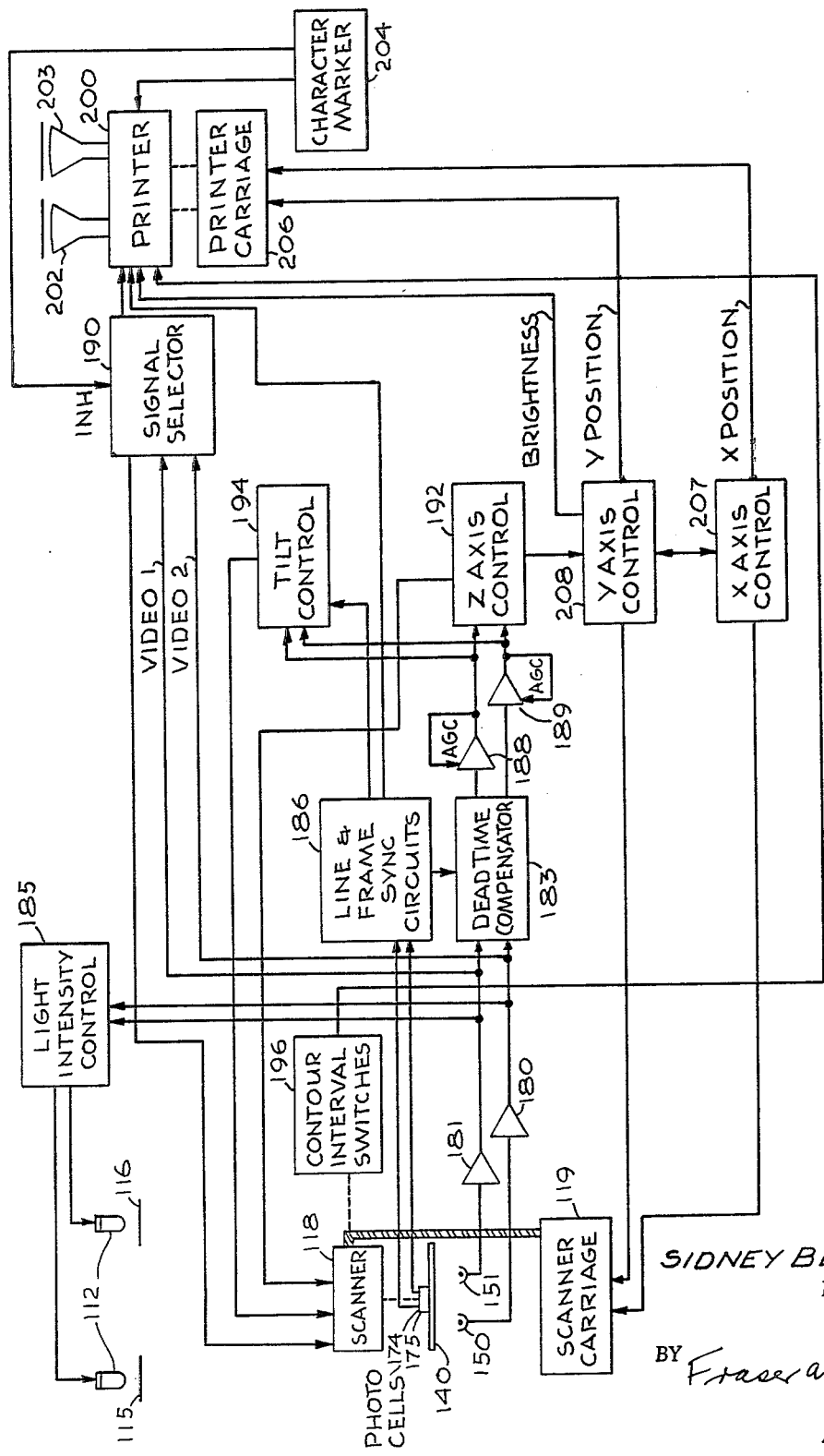
FIG. 10 is a simplified block diagram of the system of the invention including the plotter shown in FIG. 1.

A simplified diagram of the system in accordance with the invention is shown in FIG. 10. In this figure a pair of light sources 112 is shown in conjunction with a pair of diapositives 115 and 116, a scanner 118 having a scanning disk 140, a pair of photocells 174 and 175, and a pair of photomultipliers 150 and 151. As indicated in FIG. 1, the scanner 118 is mounted on a scanner carriage 119 arranged for controlling the motion of the scanner 118 in the X and Y directions. The photomultipliers 150 and 151 are coupled respectively via amplifiers 180 and 181 to a dead-time compensator 183 and to a signal selector 190. In addition, the output terminals of the amplifiers 180 and 181 are coupled to a light intensity control stage 185 to complete a feedback loop for the control of the intensity of the light sources 112. The photocells 174, 175 are coupled to line and frame sync circuits 186 which in turn are coupled to the dead-time compensator 183 and to various other portions of the system for controlling the processing of the video information derived from the photomultipliers 150, 151 in accordance with the sync pulses generated by the photocells 174 and 175. From the output of the dead-time compensator 183, dual channels of video signals are coupled via automatic gain controlled amplifiers 188 and 189 to a Z axis control stage 192. Signals are also directed from the output of the amplifiers 188, 189 to a tilt control stage 194 which controls the tilt of the disk 140 in the scanner 118.

In a manner to be described, the better of the two video signals from the amplifiers 180 and 181 is selected by the signal selector 190 and passed from the signal selector to a printer 200 to develop the orthophoto. The printer 200 includes a pair of cathode-ray tubes 202 and 203 for printing the orthophoto and the altitude drop-line chart respectively. The altitude drop-line chart is printed in response to signals received by the printer 200 from a group of contour interval switches 196 coupled to the scanner 118. A character marker 204 is coupled to the printer 200 for generating appropriate character signals to designate particular points on the print-out photos as desired. The printer 200 is affixed to a printer carriage 206 which, together with the scanner carriage 119, is positioned in accordance with signals from an X axis control stage 207 and a Y axis control stage 208.

In the automatic operation of the system of FIG. 10, the operator first establishes an accurate stereo model by appropriate adjustment of the light imaging mechanisms 113 (FIG. 1) to bring into registration known bench marks positioned on the respective diapositives 115, 116 and also positions the carriage at the desired starting point. In addition to positioning the scanner carriage 119 at the initial X and Y coordinate points, the Z carriage is adjusted to the corresponding altitude of the stereo image at the starting point and the system is placed in automatic operation. In the automatic operating mode, the scanner carriage 119 traverses across the image in the Y direction and steps by a preselected distance in the X direction at the end of each traverse as indicated in FIG. 2.

In this mode of operation, the overlapping portions of the projected images from the two diapositives 115, 116 are scanned simultaneously to provide corresponding video signals that are representative of the terrain imagery in the two diapositives. The scanning is accomplished mechanically using the Nipkow disk 140. The video signals which are obtained from the photomultipliers 150, 151 are analyzed in the Z axis control stage 192 for the time coincidence of correlated elements in order to determine the error or deviation from true image elevation in the elevation of the scanner 118. The resulting error signal is fed back from the Z axis control stage 192 and is used to raise or lower the scanner 118 together with its Nipkow disk 140. This portion of the system therefore forms a closed loop altitude servo mechanism.

A simple demonstration of the way in which signals from the photomultiplier tubes 150 and 151 may be analyzed to develop a corresponding height error signal is made by reference to FIGS. 11 and 12. FIG. 11 is a simplified schematic diagram showing respective light beams from the light sources 112 passing through the diapositives 115 and 116 to intersect at a point P, the X, Y and Z coordinates of which model the position of the point in the terrain of the photographs. After intersecting at the point P, the light beams continue to the photomultiplier tubes 150 and 151, designated P1 and P2 respectively. First assume that the Nipkow disk (not shown) is in position to scan the image at the correct altitude as indicated by the dashed line C; that is, the Nipkow scanning disk is at an elevation corresponding to the image surface at the point P. When a scanning aperture is at the point P, both beams of light pass through the disk aperture to the corresponding photomultipliers 150, 151 simultaneously with the result that the video signals developed by the photomultiplier tubes 150, 151 are coincident in time as shown by the simplified waveforms designated A in FIG. 12. If the Nipkow scanning disk is moved to the dashed line H, the disk is too high and the light beam from the diapositive 115 passes through to the photomultiplier 151 before the corresponding beam from the diapositive 116 passes through to the photomultiplier 150 (assuming that scanning proceeds from left to right in FIG. 11). The result is a pair of waveforms having the same general shape but displaced in time relationship in the manner of the waveforms B of FIG. 12. On the other hand, should the scanning disk be too low, as indicated by the dashed line L, the light beam from the diapositive 116 passes to the photomultiplier 150 before the corresponding light from the diapositive 115 passes to the photomultiplier 151 so that the waveforms displaced in the manner of the waveforms C of FIG. 12 are developed. The polarity and magnitude of the time delay between the respective video signals developed by the photomultipliers 150 and 151 provides a measure of the height error of the scanning disk 140. While the signals are not in general so well defined as the pulses shown in FIG. 12, it is still possible to consider that they are in time coincidence or that one is early with respect to the other on the basis of examining corresponding similar element of the signals. If the video signals are in time coincidence the altitude of the scanner 118 is correct; if the signals are not precisely in phase, the elevation of the scanning disk is adjusted in accordance with the resulting error signal.

Figure 13:
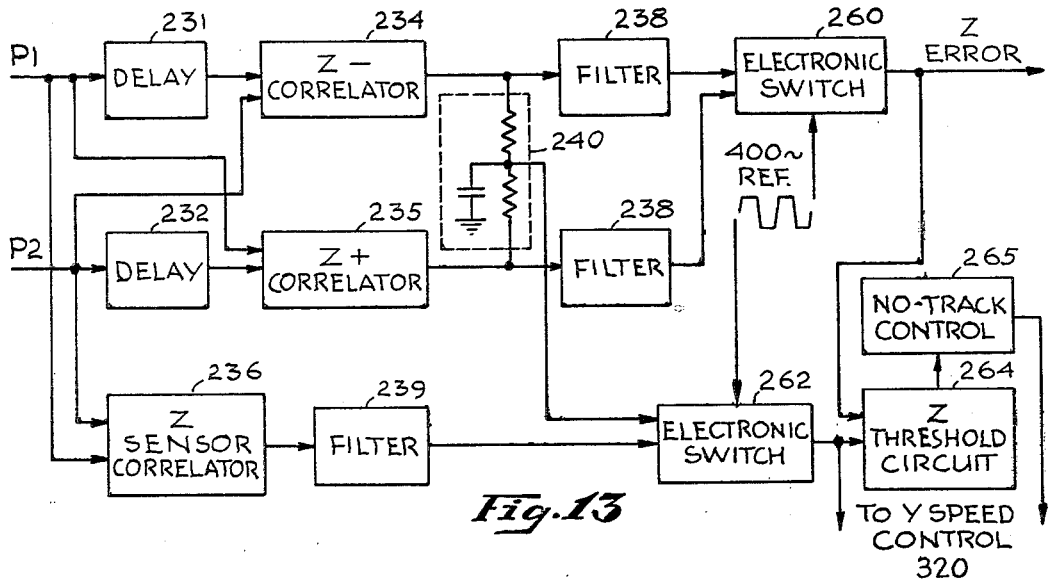
FIG. 13 is a block diagram representing a height error generating circuit which may be included in the Z axis control portion of the arrangement of FIG. 10.

The portion of the Z axis control stage 192 of FIG. 10 which develops the height error signal together with certain other control signals in response to video signals received from the photomultipliers 150 and 151 may be seen in greater detail in the block diagram of FIG. 13. In this figure, a pair of delay networks 231 and 232 are arranged together with a Z— correlator 234 and a Z+ correlator 235 to receive signals from the respective photomultiplier tubes designated P1 and P2. As shown, each of the photomultiplier signals is fed directly to one of the Z correlators and through a delay network to the other Z correlator. Thus each correlator used for height sensing receives video signals from both photomultipliers with one signal being delayed to one correlator and the other being delayed to the second correlator. Since the correlators 234, 235 each operate to provide an output signal that is maximum when the two input signals are in time coincidence, the output signal from one Z correlator increases in output as the scanning moves up from the model surface while the output signal from the other correlator decreases. The output signals from the two Z correlators 234, 235 are applied through individual filtering networks 238 to an electronic switch 260 where they are sampled sequentially at a rate synchronized with the frequency of the servomotor power source (shown in this case to be 400 cycles per second). The output of the switch 260 is a Z or height error signal of appropriate magnitude and polarity for the Z axis control of the scanner 118. In the sampling of the signals from the filters 238, the two signals are alternately connected at a 400 cycle rate to the Z error output lead which automatically combines the signals in a manner which preserves the polarity of the difference between them as a function of the pase of the height error signal produced at a rate of 400 cycles per second. In this manner each signal from a filter 238 serves as a reference for the other signal so that no other reference is required.

The time delay introduced by the respective delay stages 231 and 232 is designed to be a particular function of the scanning rate and the image detail being correlated. If the time delay is too short inadequate error signals are developed in response to significant deviations of the scanning elevation whereas if the time delay is too great, the correlation between the original and the delayed signals is insufficient to develop satisfactory error signals.

In a system such as the present invention, wherein different time delays are provided for signals which are used with multiplying correlators to develop an error signal related to time displacement between corresponding elements of two separate input signals, the optimum delay is a function of the nature of the signal and of the purpose for which it is employed. In accordance with an aspect of the present invention, a particular time delay is provided at the input stages to the correlators of the error signal generator which is specifically related to the scanning rate provided by the Nipkow disk and the image detail to which the system is intended to respond.

Figure 15:
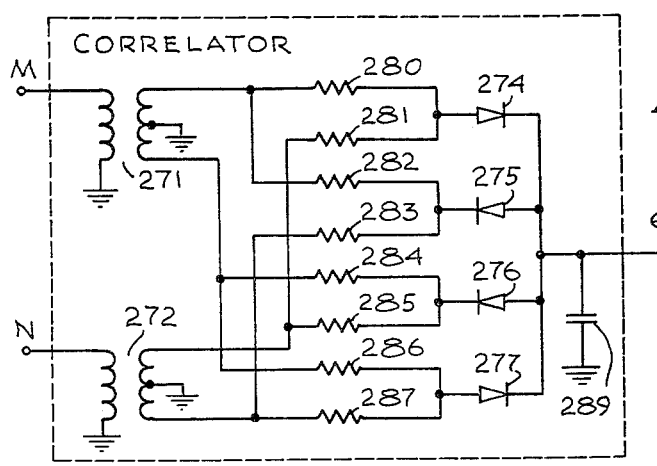
FIG. 15 is a schematic diagram of a particular correlator circuit suitable for use in the arrangements of FIGS. 13 and 14.

The output of a correlator such as is shown in FIG. 15 may be considered as a function of the time displacement between the two input signals. The effective limit of resolution of the image scanned by the Nipkow scanning disk is related to the width of the scanning apertures in the direction of the scan. It has been found that the useful limit of resolution occurs for image detail which is approximately equal to the aperture width. As a particular scanning aperture moves across an increment of the image having fine photographic detail approaching the effective limit of resolution, each associated photomultiplier produces a signal having a peak located at the point of maximum alignment with the scanning aperture and having a time duration at the base greater than the time actually required to scan the particular image detail by approximately twice the time required for a point on the aperture to move across its width. If the particular image detail is at the effective limit of resolution of the scanner, that is, if the detail has a lateral dimension approximately equal to the width of the scanning aperture, the time duration of the pulse produced by the associated photomultiplier is approximately equal to the time required for the scanning aperture to move a distance equal to two times its own width.

Figure 14:
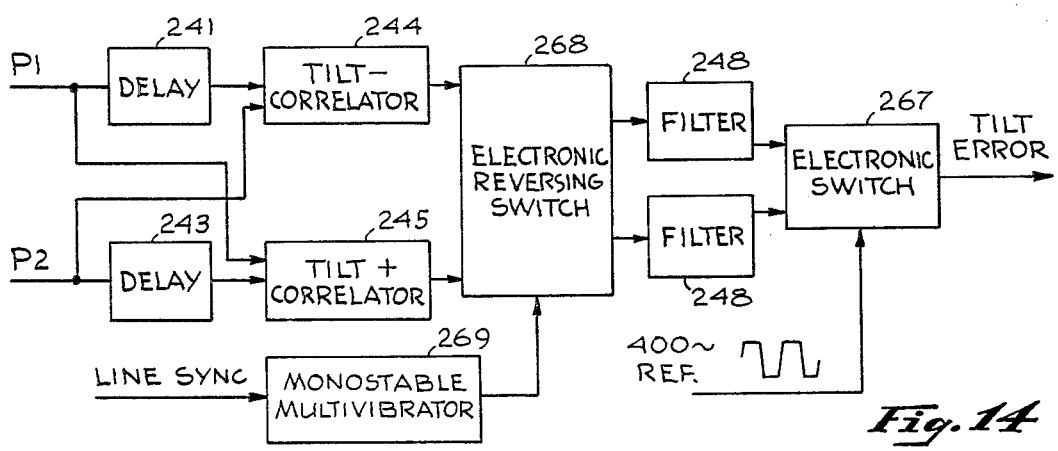
FIG. 14 is a block diagram of a particular tilt error generating circuit which may be employed as part of the tilt control portion of the arrangement of FIG. 10.

When two such signals are applied to a correlator, a useful output signal is produced only when there is some degree of overlap between the two input signals. If one of the input signals is to be delayed by some time interval, the time delay should be such that the signal overlap is not entirely eliminated. It has been found that the optimum time delay to be provided for the differential correlators, such as are shown in FIGS. 13 and 14, is in the range of two to three times the time required for a scanning aperture to move the distance equal to its width. This time delay is optimized in accordance with a maximum resolution of image detail to which the system is desired to respond in order to achieve a suitable compromise between maximum sensitivity to scanner elevation errors and maximum range over which the system can respond to such error. In one particular arrangement of the invention, time delays of 20 microseconds are provided which represent a value of 2½ times the time required for an aperture to move its own width with a Nipkow scanning disk having apertures .008 inch in diameter spaced at a mean radius of 2.6 inches from the center and rotating at 60 revolutions per second for a resultant scanning velocity of 980 inches per second.

An RC network 240 (FIG. 13) is connected across the output terminals of the Z correlators 234 and 235 in order to develop a signal which is an average of the output signals from the correlators 234 and 235. Concurrently the signals from the two photomultiplier tubes P1 and P2 are also fed directly (without delay) to a Z sensor correlator 236 which compares the undelayed signals and develops a large output signal when the height error is small, providing there are reasonably good signals from both photomultipliers. This signal is a measure of the degree of correlation of the photomultiplier signals. The output signal from the Z sensor correlator 236 is filtered in a filter stage 239 and then applied to the electronic switch 252 where it is sampled periodically with the signal from the RC network 240 to provide a 400 cycle per second signal for Y speed control so that the profiling operation may be slowed down automatically when the correlation level becomes marginal. The output signal from the electronic switch 262 is also applied, along with the Z error signal from the electronic switch 260, to a Z threshold circuit 264 which energizes a no-track control stage 265 to stop the profiling operation if the correlation level falls below a predetermined threshold, thus indicating that the terrain signals are not adequate for automatic profiling or, alternatively, if the Z error signal becomes too large, thus indicating that the scanner has lost the image contour. A no-track signal is developed in the event of either of these marginal conditions and used to energize a signaling device to call the attention of the operator to the fact that automatic tracking has been interrupted.

As already mentioned, the Nipkow scanning disk 140 is capable of tilting about an axis parallel to the Y axis in order to more nearly conform with the terrain in sloped areas. By tilting the scanning disk 140 in this manner, a better signal-to-noise ratio is developed for the correlation output signals and the parallax interference which would otherwise be present in sloping terrain is advantageously eliminated or at least minimized. Signals to drive the tilt control circuitry 194 are also obtained from the scanning operation. In effect each scanned line is divided at the center and signals for the two halves are examined independently to determine individual height error signals which are then compared to ascertain the tilt error. The tilt error signal thus developed from the two halves of the scan is used to drive the tilt control circuit 194 (FIG. 10). The tilt error signal is developed by circuitry which is similar to that used for altitude sensing.

A block diagram of the tilt control circuit 194 is shown in FIG. 14. As in the circuit of FIG. 13, signals from each of the photomultipliers P1, P2 are directed through first paths comprising the delay lines 241 and 243 to tilt correlators 244 and 245 where signals from each of the photomultipliers are compared with undelayed signals fed directly to the correlators from the other photomultiplier. The correlator's output signals are then directed to an electronic reversing switch 268 which is switched by signals from a monostable multivibrator 269 which in turn is triggered by line sync pulses from the line sync portion of the sync circuits 186. Under the control of the monostable multivibrator 269 the connections between the input and output terminals of the electronic switch 268 are reversed at the midpoint of each line scan. The dual output signals from the electronic switch 268 are then applied via separate filters 248 to an electronic switch 267 where synchronous sampling of the input signals at a 400 cycle per second rate is accomplished in a manner similar to that described with respect to the development of the Z error signal in the circuit of FIG. 13. The circuit of FIG. 14 thus provides a comparison between height error signals developed for different halves of each line scan. If the error signals are equal, the indication is a constant altitude error over the total line which means no tilt correction is needed. If, however, one-half of the line scan shows a larger altitude error than the other, the result is an indication of improper tilt; this appears in the form of a tilt error signal at the output of the switch 267 which is directed to the tilt servomotor (FIG. 18) to change the tilt of the Nipkow disk 140.

A particular circuit which may be employed to serve as a correlator such as correlators 234, 235, 236, 244, and 245, shown in the arrangements of FIGS. 13 and 14 is represented schematically in FIG. 15. The correlator circuit of FIG. 15 comprises a pair of transformers 271 and 272 coupled to receive input signals represented as M and N. The output windings of the transformers 271, 272 are coupled to resistors 280–287, connected as shown, which in turn are coupled to diodes 274–277. An output signal is derived from a common connection of the diodes 274–277 across a capacitor 289.

In the described embodiment of the present invention, signal correlation is extremely important for suitable automatic control of scanner position, and particularly advantageous results are obtained through the use of the multiplying correlator represented in FIG. 15. The diodes 274–277, together with the resistors 280–287, provide an approximation to a square law current-voltage relationship. The two transformers 271, 272 are used to make available both polarities of the two input signals M and N. The output voltage $e_0$ across the capacitor 289 can be written $$e_0 = \frac{K}{RC} \int_0^T [(M+N)^2 - (M-N)^2] dt \qquad (1)$$

where K is an arbitrary constant of proportionality, R is the resistance of one of the resistors 280–287 and C is the capacitance of the capacitor 289. Here $M+N$ is supplied through the diode 274 if $M+N>0$, and through the diode 277 if $M+N<0$. Similarly, $M-N$ is supplied through diode 275 if $M-N>0$, and through diode 276 if $M-N<0$. Diodes 275 and 276 are reversed in polarity to effect the subtractions. Equation 1 simplifies to $$e_0 = \frac{4K}{RC} \int_0^T MN dt \qquad (2)$$

so that the output voltage is a measure of the average product of the two signals and, hence, of the degree of correlation between them. For example, if M and N are oscillating signals of random characteristics, the product will have many positive and negative contributions and, hence, a low average; whereas if M and N are identical, the instantaneous products are always positive and, hence, form a non-cancelling sequence. The desired integral represented by Equation 1 and 2 is only approximated with the simple circuit shown in FIG. 15, but the depicted circuit is quite effective as a means of detecting signal correlation.

Operation of the Nipkow disk 140 is such that there is a dead time between successive line scans. That is, the successive movement of scanning apertures across the scanned frame precludes a smooth transition of video signals from one line scan to the next. If the spacing of the scanning apertures is arranged to provide an overlap, there is a considerable increase in the intensity of the light received by the photomultipliers 150 and 151 as one scanning aperture leaves the frame and the next scanning aperture enters. Conversely, if a gap between successive line scans is provided, the light is momentarily shut out as the scan shifts from one line scanning aperture to the next. If the resultant dead time between successive line scans were not compensated, it would result in a large extraneous transient in the video signals which would reduce the effectiveness of the AGC amplifiers 188 and 189 (FIG. 10) and hence of the correlation. The dead-time compensator 183 (FIG. 10) is arranged to provide the desired compensation. The details of the operation of the dead-time compensator 183 can be seen in the diagram of FIG. 16, which shows an exemplary arrangement of the dead-time compensator for one of the photomultiplier channels.

Figure 16:
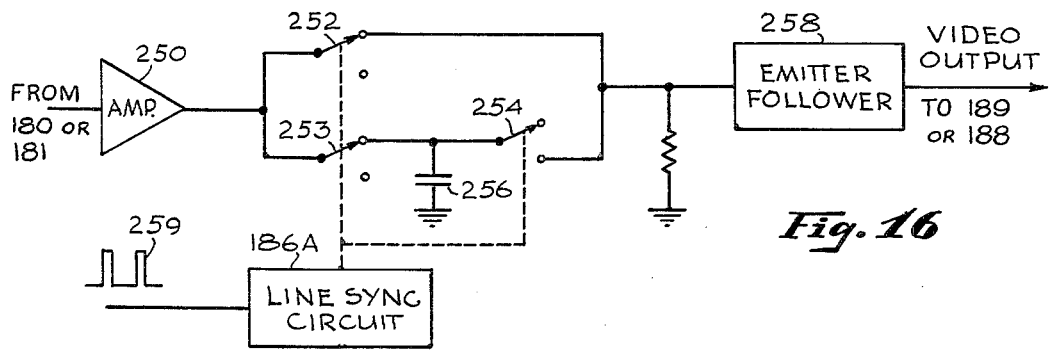
FIG. 16 is a schematic diagram of a dead-time compensator circuit which may be used in the arrangement of the invention shown in FIG. 10.

In the circuit of FIG. 16 three switches, designated 252, 253, 254, are controlled by the line sync circuit 186A which is triggered by line sync pulses 259 from the line and frame sync circuits 186 (FIG. 10). Video signals from a preamplifier 180 or 181 enter as an input to an amplifier 250 and leave as video output signals from an emitter follower 258. During a line scan the switches 252, 253 and 254 are in the position shown. Thus the video signals are passed through the circuit of FIG. 16 and at the same time a capacitor 256 is charged to an average level of the video signals. Just before the end of a line scan, a line sync pulse 259 is generated by the line sync photocell 174 (FIGS. 7 and 10). The line sync circuit 186A then operates to change the position of all three switches 252–254, disconnecting the input video signal from the output and from the holding capacitor 256 while connecting the holding capacitor 256 to the output side of the circuit. The holding operation provided in this manner results in a blanking interval which is not significantly different from the normal signal. This operation is particularly important in bright areas of the imagery where otherwise the dark signal at the end of the trace( in the absence of overlap of the scanning apertures) would be very disturbing.

The light intensity control circuitry 185 shown in FIG. 10 is arranged to ensure a reasonable signal to the video analysis circuitry despite deficiencies in quality of the diapositives. In areas of low transmission, the projection light sources 112 are brightened in intensity, thereby increasing the chance that the useful video signals will be above the noise level. In areas of high transmission, the light output is reduced in order to increase the life of the projection light sources 112. The light intensity control circuit 185 comprises a pair of magnetic amplifiers, one for each light 112, which are controlled by signals from the photomultiplier amplifiers 180 and 181 in an arrangement which completes the feed-back path and provides a closed loop servo control for the lights 112. By means of this arrangement, the intensity of the lights 112 is varied so that the average level of the signals present at the output of the amplifiers 180 and 181 is held constant within the limits of the light intensity control circuitry 185. The light control circuitry may also be utilized to provide a constant light level for the different portions of the image so that the light intensity does not drop off at the corners of the image field as a result of heh greater distance of the scanner from the light sources. The maximum brightness of the lights 112 is limited in order that the life of the projection lights is not unduly shortened. A light control potentiometer is also provided so that the brightness of the lights 112 may be controlled manually if desired.

The X axis control circuit 207 (FIG. 10) and the Y axis control circuit 208 serve to drive the scanning carriage 119 in the X and Y directions and also provide signals which control similar positioning mechanisms for the printer carriage 206. Details of this particular portion of the system of FIG. 10 may be found in FIG. 17 which shows the scanner carriage 119 arranged for motion in the Y direction under the control of a Y servomotor 310 and in the X direction under control of an X stepper motor 311. The scanner carriage 119 is mechanically coupled to an X resolver 314 and to a Y resolver 315 which comprise synchro transmitters arranged to develop control signals for application to corresponding servomotors in the printer carriage 206 to control the position thereof in accordance with the position of the scanner carriage 119. X and Y limit switches 317 and 318 respectively are also mechanically coupled to the scanner carriage 119 to disable the drive mechanism whenever the limit of traverse in a particular direction is reached.

The Y servomotor 310 is driven by a control signal from a Y speed control circuit 320, which is coupled to receive signals from a reversing control circuit 321 and from the sensor correlator 236 and the no-track control stage 265 of FIG. 13. The X stepper motor 311 is driven in response to signals received from an X stepper motor control control stage 323. A counter 325 is coupled to energize the X stepper motor control circuit 323 in accordance with the setting of an X step selector 326.

Figure 17:
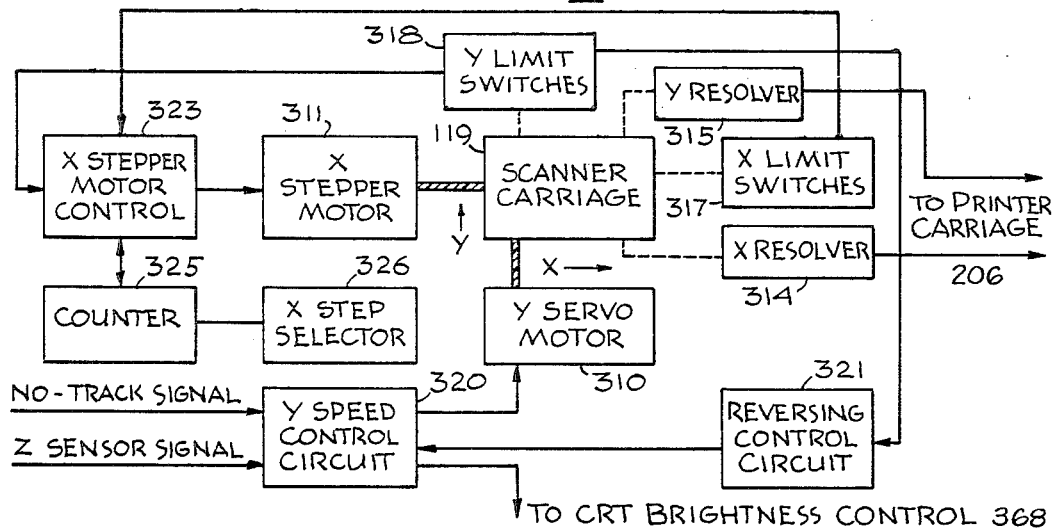
FIG. 17 is a block diagram showing in greater detail the scanner carriage control portion of the arrangement shown in FIG. 10.

In the operation of the arrangement of FIG. 17, a particular X increment is set in the X step seelctor 326 and the Y speed control circuitry 320 is set to traverse in the automatic mode. Thereupon the Y servomotor 310 drives the scanner carriage 119 across the field of the stereo image in the Y direction. When a limit of Y traverse is reached, a particular Y limit switch 318 applies signals to the X servomotor control circuit 323 and to the reversing control circuit 321. The X servomotor control circuit 323 then proceeds to energize the X stepper motor 311 by generating pulses at a predetermined rate. These pulses are counted by the counter 325 which disables the X servomotor control stage 323 when the count reaches the setting of X step selector 326.

The signal applied from the Y limit switch 318 to the reversing control circuit 321 initiates the operation of the reversing circuit. Once activated, the reversing control circuit 321 follows a predetermined sequence of operation. The circuit 321 first applies a reduced drive voltage in the forward direction to the Y speed control circuit 320 for a brief interval, during which time the scanner carriage slows down. Next, a drive voltage of the opposite polarity is applied to the Y speed control circuit 320 which reduces the velocity of the scanner carriage 119 to zero and then causes it to accelerate to normal velocity in the reverse direction. In this manner, the time required for the scanner carriage 119 to decelerate is made substantially equal to the time required for the scanner carriage to accelerate to normal speed when its direction of travel is reversed.

Should the automatic tracking proceed normally, the scanner carriage 119 continues to move back and forth at the normal rate in the manner described. However, if a Z sensor signal indicating a poor degree of correlation in the signals from the photomultipliers is received by the Y speed control circuit 320 from the Z sensor correlator 236 via switch 262 of FIG. 13, the speed of the Y servomotor 310 is reduced by virtue of the control provided by the Y speed control circuit 320 so that suitable scanning information may be derived at a slower rate. Should the Z threshold circuit 264 of FIG. 13 determine, in response to its applied input signals, that either the degree of correlation is inadequate or the Z error is too great, a signal is received from the no-track control circuit 265 which causes the Y speed conrol circuit 320 to interrupt the traverse of field of the stereo model by the scanner carriage 119. Under such circumstances, a warning signal is provided as an indication that tracking has been interrupted. During the changes in the speed of the movement of the scanner carriage 119, the Y speed control circuit 320 provides a signal which is applied to the cathode-ray tube brightness control in the printer 200 to adjust the brightness in accordance with the velocity of the scanner carriage 119 so that the shades printed out in the orthophoto and altitude dropline chart are unaffected by variations of velocity of the scanner carriage 119.

Figure 18:
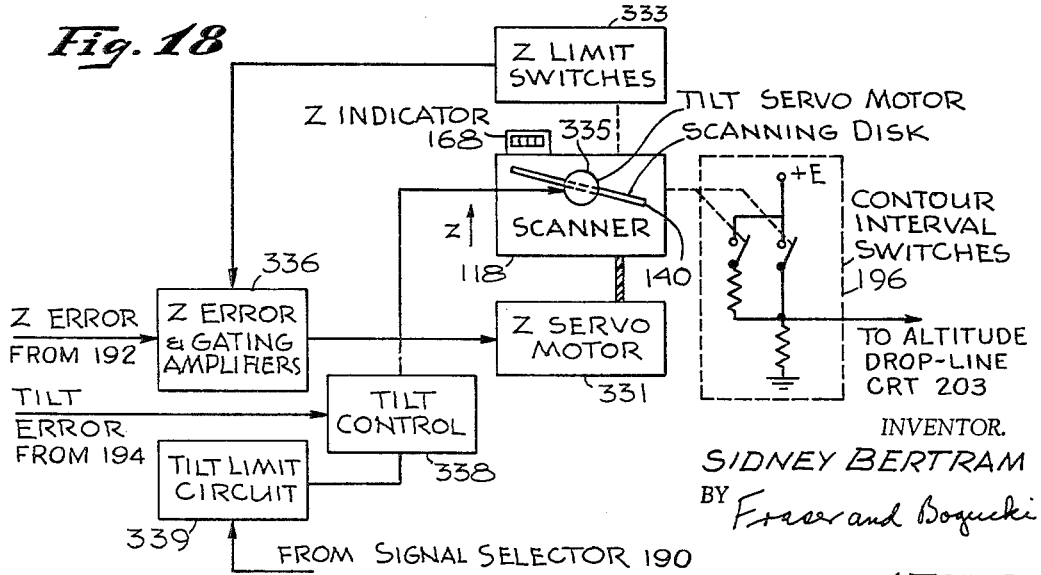
FIG. 18 is a block diagram showing in greater detail the Z axis and tilt control portions of the arrangement of FIG. 10.

A portion of the particular arrangement of the invention shown in FIG. 10 having to do with the height and tilt control of the scanner 118 is shown in somewhat greater detail in the block diagram of FIG. 18. In FIG. 18 the scanner 118 is represented as mechanically coupled to the Z servomotor 331, the Z limit switches 333, and the contour interval switches 196. The scanning disk 140 is mounted on the scanner 118 and arranged for tilting about an axis parallel to the Y axis by means of a tilt servomotor 335. A Z error and gating amplifier 336 is coupled to receive a Z error signal (FIG. 13) and control the Z servomotor 331 in response thereto. A tilt control stage 338 is connected to receive tilt error signals and to drive the tilt servomotor 335 in accordance with these signals so long as they are not blocked by tilt limit levels applied from the tilt limit circuit 339.

The Z error signals as developed in the Z error generator shown in FIG. 13 are in the form of 400 cycle pulses synchronized with the servomotor power source. The Z error signal is either in phase or out of phase with the power source and has a magnitude which is related to the deviation of the height of the scanning disk 140 from the elevation of the incremental area of the image being scanned. As amplified in the amplifier 336, the Z error signal thus serves to energize the Z servomotor 331 to drive the scanner 118 either up or down toward the proper elevation. As the scanner 118 changes elevation, the contour interval switches 196 are driven in a rotary sequence to develop an output signal indicative of scanner height which is applied to the printer 200 to control the printing of the altitude drop-line chart. In the circuit shown in connection with the contour interval switches 196, it can be seen that three different levels of output signal are produced for the three different states of the switches, namely, either both open, or one or the other closed. For the circuit shown, the contour interval signal has the three values of ground potential, +E, or some potential midway between the two. As has already been described, this arrangement of the invention results in white, gray or black coding on the altitude drop-line chart in correspondence with changes in elevation of the scanner 118. The use of a rotary sequence code in this fashion provides the desired information as to the direction of elevation change in addition to indicating the occurrence of a change between selected intervals of elevation.

The scanning disk 140 is arranged to be tilted by the tilt servomotor 335 to conform to the slope of the terrain of the image in order that a better correlation between the signals from the photomultiplier tubes may be obtained, thus enhancing the derived Z error signals. However, the use of the Nipkow disk 140 as the mechanical scanning mechanism for altitude sensing imposes a limitation on the useful range over which the terrain slope can be followed by tilting the Nipkow disk. If the projected image at the Nipkow disk is incident at a greater angle than 65° to the normal, very little light can go through the disk apertures to the photomultipliers 150, 151, because of interference from the edges of the disk window. Conformity to the slope of the terrain is therefore a matter of compromise; correlation is improved by tilting the scanning disk 140, provided that the image is not blocked. In practice this means that the tilt of the scanning disk 140 must be limited to some maximum value which is dependent upon the position of the scanner 118 in the stereo area. At the extreme edges of the stereo model, the maximum allowable tilt in one direction is clearly less than that which is permissible at the center of the model. The maximum allowable tilt in a given direction also varies considerably from one edge of the model to the other. In the specific embodiment of the invention described herein, the maximum allowable tilt at the edges of the stereo model is about 25° in the direction increasing the angle of incidence of the light from the more distant projector. In the system of the invention disclosed herein, an arrangement is provided which utilizes signals indicative of the X coordinate position of the scanning carriage 119 to limit the permissible tilt of the Nipkow scanning disk 140. The way in which the limit signals are developed will be discussed in connection with the description of FIG. 19. which includes a circuit developing these position signals. An additional limitation on the tilt of the scanning disk 140 is imposed by virtue of the mechanical configuration of the housing of the scanner 118 and the clearance afforded at the limits of travel of the scanner 118. The tilt limit circuit 339 (FIG. 18) is disclosed in greater detail in U.S. Letters Patent No. 3,244,066, issued Apr. 5, 1966, entitled "Tilt Limiting Arrangement for Mechanical Element," July 16, 1962, Ser. No. 209,856, Patent No. 3,244,066 and assigned to the assignee of this invention. Suffice it to say that whenever the tilt limit of the scanning disk 140 for any position of the scanner 118 is reached, the tilt limit circuit 339 applies a disabling signal to the tilt control 338 which blocks any error signal tending to increase the tilt beyond the limit. However, the circuit 339 is arranged to permit tilt error signals which would decrease the tilt angle of the scanning disk 140 to be passed to the tilt servomotor 335. Thus maximum utilization of the tilt error signals is achieved within the tilt limits actually imposed.

Figure 19:
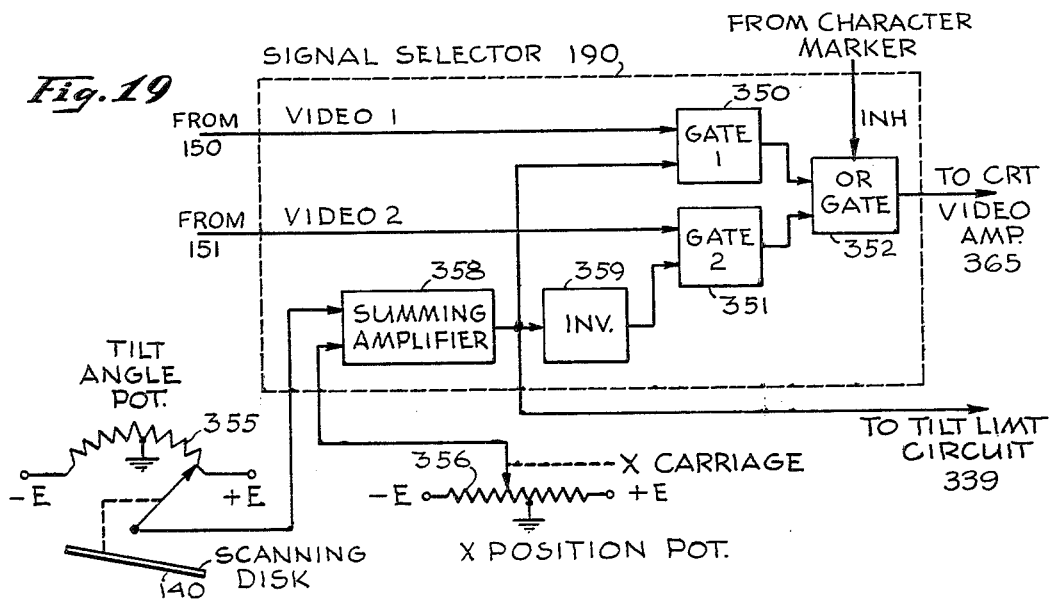
FIG. 19 is a block diagram representing details of the signal selector portion of the arrangement of FIG. 10.

FIG. 19 is a more detailed diagram of the signal selector 190 and also shows the circuitry used for developing a composite signal indicating the scanner position and tilt for application to the tilt limit circuit of FIG. 18 and for controlling the signal selector 190 (FIG. 10). The signal selector 190 is shown in FIG. 19 comprising a pair of AND gates 350 and 351 coupled to receive the respective video signals from the photomultipliers 150, 151 and to select the better of these two signals for application to the orthophoto cathode-ray tube video amplifier in the printer 200 through an OR gate 352. The selection of the better video signals by the gates 350 and 351 is controlled in accordance with the angle of tilt of the scanning disk 140 and the X position of the scanner carriage 119. A tilt angle sensor shown as a potentiometer 355 is arranged with its wiper mechanically coupled to the scanning disk 140 so that it follows the existing tilt of the scanning disk 140. The potentiometer 355 is connected between +E and −E with a center tap connected to the ground. A similar potentiometer 356 is connected in like fashion to provide a signal corresponding to the X position of the scanner carriage 119. The wiper of the potentiometer 356 is mechanically coupled to the carriage 119 and movable therewith. The signals picked off by the wipers of the respective potentiometers are applied to a summing amplifier 358 which develops an output signal that is a composite of the two input signals derived from the potentiometers 355 and 356. The composite signal is applied to the tilt limit circuit 339 of FIG. 18 so that when the tilt angle becomes excessive for a particular scanner position, the tilt error signals tending to increase tilt beyond that amount may be blocked as already described. The signal from the output of the summing amplifier 358 is applied directly as a second input to the AND gate 350 and is inverted in the inverter stage 359 and then applied as a second input to the AND gate 351.

The operation of the signal selector 190 is such that a particular video signal is selected from the video channel which is scanning most perpendicularly to the projected light. In other words, the particular video signal selected is that corresponding to the image originating in the projector which is closer to a line drawn perpendicular to the scanning disk 140 through the scanning window. Thus, for example, if the angle of tilt is zero, the signal selector 190 shifts from one video signal to the other video signal at the midpoint of traverse of the carriage 119 in the X direction. Similarly, if the carriage 119 is located at the midpoint in the X direction, a shift between video signals occurs as the tilt of the scanning disk 140 passes through zero. Other combinations of X position and tilt angle determine the selection of the preferred video signal in accordance with the polarity of the composite signal from the summing amplifier 358. In the arrangement shown, a positive output signal from the summing amplifier 358 serves to turn on the AND gate 350 and, because of the signal inversion by the inverter 359, serves to cut off the AND gate 351. Conversely, when the output of the summing amplifier 358 is negative, the gate 350 is turned off and the gate 351 is turned on. Thus either video signal No. 1 or video signal No. 2 is available at the input of the OR gate 352 and in normal operation is applied to the printer 200. The OR gate 352 is connected to receive an inhibiting signal from the character marker 204 (see FIG. 10) so that video signals may be blocked from the printer 200 when the character marker 204 is being operated.

Figure 20:
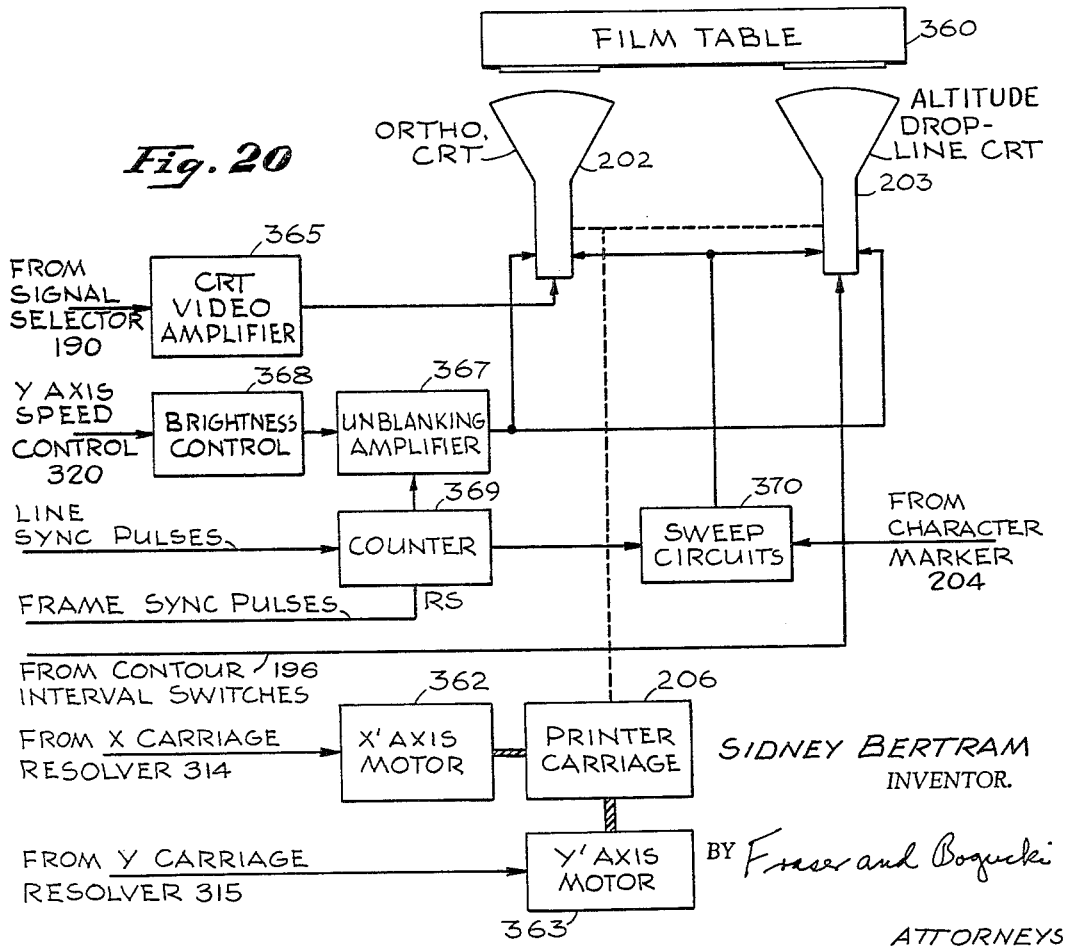
FIG. 20 is a block diagram representing the printer portion of the arrangement of FIG. 10 in greater detail.

The printer 200, utilized in the specific arrangement of the invention of FIG. 10 is shown in somewhat greater detail in FIG. 20. As shown, the printer 200 includes an orthophoto print-out cathode-ray tube 202 and an altitude drop-line print-out cathode-ray tube 203 disposed adjacent a film table 360 on which film plates may be mounted for exposure by the beams of the respective cathode ray tubes 202 and 203. The cathode-ray tubes are moved across the film table 360 by the printer carriage 206 which is driven in the X and Y directions by an X' axis motor 362 and a Y' axis motor 363. The drive motors 362 and 363 receive control signals from the X axis and Y axis control circuits 207 and 208 (FIG. 10) so that the movement of the printer carriage 206 is slaved to the movement of the scanner carriage 119.

The selected video signal received from the signal selector 190 is amplified in a cathode-ray tube video amplifier 365 and applied to the orthophoto print-out cathode-ray tube 202 to modulate the electron beam thereof in accordance with the video information developed by the photomultipliers 150, 151. Scanner elevation information developed by the contour interval switches 196 is applied to the altitude drop-line print-out cathode-ray tube 203 to modulate the electron beam thereof in order to print out the desired altitude drop-line chart. An unblanking amplifier 367 is controlled by a brightness control circuit 368 and a counter 369 to cause the cathode-ray tubes 202 and 203 to be unblanked at the proper brightness level at selected times during the scanning of the image field. In the particular arrangement of the invention described, unblanking occurs once each frame in the middle of the frame to print out a selected portion of the line occurring during the unblanking interval. This operation is controlled by the counter 369 which is driven by the line sync pulses and reset by each frame sync pulse. The brightness control circuit 368 operates in response to signals from the Y axis speed control 320 (FIG. 17) to reduce the intensity of the cathode-ray tube beams as the speed of the scanner carriage 119 is reduced. Thus a more uniform relationship between beam intensity and scanning speed is provided which advantageously renders the film exposure level independent of scanning speed.

A sweep circuit 370 for controlling the sweep of the beams of the respective cathode ray tubes 202 and 203 is connected to the counter 369 and controlled in accordance with signals from the character marker 204 (FIG. 10). The character marker 204 comprises conventional circuitry for generating selected Lissajous figures which may be superimposed on the orthophoto and altitude drop-line chart at desired points. The respective characters corresponding to the selected Lissajous figures are chosen by the operator and are generally used for marking particular points of interest in the field of operation.

The automatic stereomapping system in accordance with the invention described above may be operated to develop photographic maps presenting appropriate topographic information from a pair of diapositive photographs used in the projection of a stereoscopic image. The orthophotos and altitude drop-line charts produced in the operation of the described system may be assembled into a mosaic to provide a complete topographic map of an entire area in complete detail. The procedure of developing maps from aerial survey photos is thereby materially facilitated by the provision of an automatic system in accordance with the invention which substantially reduces the time required to develop a map from aerial photos, increases the detail and accuracy of the information presented in the resulting photomaps, and reduces the dependence for accurate maps upon the limited number of skilled mapmakers and photogrammetrists previously required for such purposes.

While the invention has been described in conjunction with automatic stereomapping systems, it will be appreciated that the principles thereof may be utilized in many other areas. The altitude information provided during the automatic scanning of a projected stereo image by the apparatus of the system may be used in other associated equipment to control the movement of a milling machine or other cutting tools, for example, to reproduce a particular surface or pattern as desired as for preparing a relief model. The scanning information derived in the operation of the present system may be recorded and used at a later time or at a distant location as desired. Accordingly, it will be appreciated that the system of the present invention is not restricted to the printing out of photographic information but may be utilized in a wide variety of applications for a number of different purposes.

Although there has been described above a specific arrangement of an automatic stereo mapping system in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

The embodiments of the invention in which an exclusive property or privilege is claimed are defined as follows:

1. An automatic profiling system comprising:
   means for providing a stereoscopic image projected from a pair of separate related images of an area to be mapped;
   a scanner which is movable over the extent of the stereoscopic image and which may be varied in elevation and in degree of tilt with respect to a reference plane representing a selected elevation;

means for selectively varying the elevation and degree of tilt of the scanner;

a pair of transducers spaced along a line which is substantially parallel to the alignment of the separate related images and movable with the scanner for developing individual video signals in accordance with incremental areas of the stereoscopic image;

error signal generating means coupled to the transducers for receiving the individual video signals and for developing error signals in accordance therewith indicative of the deviation of the scanner from the relative elevation of a selected incremental portion of the stereoscopic image and of the deviation of the tilt of the scanner from the slope of the stereoscopic image at that portion;

means responsive to the error signals for controlling the scanner in a direction to reduce said error signals; and means coupled to the scanner for providing an indication of scanner elevation relative to the selected plane.

2. An automatic stereomapping system comprising:

a pair of projectors for projecting a stereoscopic image by illuminating at least portions of a pair of stereoscopic photographs;

a scanner for scanning the extent of said projected stereoscopic image by traversing it in a predetermined profiling pattern;

a pair of transducers spaced in substantially parallel alignment with the photographs for producing individual video signals in accordance with incremental areas of the image being scanned;

a plurality of signal correlators connected to the transducers for receiving the signals produced by said transducers;

means for selectively delaying the individual signals applied to the correlators;

means for selectively switching between the outputs of the correlators to develop first error signals for controlling the elevation of the scanner relative to a reference plane representing a selected elevation and second error signals for controlling the degree of tilt of the scanner;

means for controlling the elevation and tilt of said scanner in accordance with the respective error signals;

first printing means including coding means coupled to said means for controlling the elevation and tilt of said scanner for developing at least three distinct coded elevation signals in a selected sequence relative to the direction of elevation change providing an altitude drop-line chart related to the elevations of said scanner as said stereoscopic image is traversed; and second printing means including selecting means coupled to said pair of transducers for selecting a preferred one of said individual video signals and for printing an orthophoto in accordance therewith;

said printing means being coupled to receive the individual signals from the transducers.

3. An automatic stereomapping system comprising:

means for projecting a stereoscopic image from a pair of separate related images of an area to be mapped;

a scanner including a Nipkow scanning disk for developing sequential line scans of selected incremental areas of the stereoscopic image;

a pair of photomultiplier tubes positioned in substantially parallel alignment with the separate related images to receive light passed by the Nipkow scanning disk for developing individual video signals in accordance therewith;

a dead-time compensator coupled to the photomultiplier tubes for substantially eliminating the transient present in said video signals between each pair of line scans by the Nipkow disk;

means for analyzing said video signals to develop error signals corresponding to the deviation of the elevation and tilt of said Nipkow scanner with respect to said stereoscopic image;

means coupled to the scanner for traversing the extent of the stereo image and for adjusting the elevation and tilt of the Nipkow disk relative to a reference plane representing a selected elevation; and printing means coupled to the photomultiplier tubes and to the scanner respectively for producing both an orthophoto which is an orthographic projection of the incremental areas of the surface of the stereoscopic image and an altitude drop-line chart indicating the elevation of substantially each incremental area of the stereoscopic image.

4. An automatic stereomapping system in accordance with claim 3 wherein the dead-time compensator further includes a circuit for developing a signal corresponding to the video signals produced during a line scan and means for periodically substituting said signal for said video signals during the dead-time interval between the end of said line scan and the next succeeding line scan.

5. An automatic stereomapping system comprising:

a scanner;

means for projecting a stereoscopic image from a pair of separate related images of a region to be mapped;

means for moving the scanner over the extent of the projected image;

first and second photomultiplier tubes spaced in substantially parallel alignment with the separate related images, said photomultiplier tubes being movable with the scanner for receiving light signals in accordance with the scanned portion of the stereoscopic image and producing first and second video signals in accordance therewith;

error signal generating means connected to receive video signals from the photomultiplier tubes for providing height error and tilt error signals to control the elevation and tilt of the scanner, the error signal generating means comprising a pair of correlators, a pair of delay circuits coupled respectively to the correlator inputs to define first and second correlation channels;

means coupling the first photomultiplier to the delay circuit of the first channel and to the correlator of the second channel;

means coupling the second photomultiplier to the delay circuit of the second channel and to the correlator of the first channel;

means for switching at a predetermined rate between the respective output signals of the correlators of the first and second channels;

means for controlling the elevation and tilt of the scanner relative to a reference plane representing a selected elevation in accordance with the height error and tilt error signals; and output means also connected to receive said video signals for providing a visual display in accordance therewith.

6. An automatic stereomapping system in accordance with claim 5 wherein said error signal generating means further comprises an additional pair of correlators coupled to the photomultiplier tubes for providing a signal indicative of the correlation of said first and second video signals; and means responsive to said signal for at least interrupting the scanning in the event that said signal falls below a preselected threshold value of correlation.

7. In an automatic profiling system the arrangement comprising:

apparatus for projecting a stereoscopic image from a pair of separate related images;

a scanner for automatically scanning a predetermined portion of the stereoscopic image;

a pair of transducers spaced in substantially parallel alignment with the separate related images for producing video signals in response to light passed by the scanner;

tilt and height control circuits responsive to said video signals for controlling the tilt and height of said scanner in accordance with the time displacements detected in said video signals;

position indicating means coupled to the scanner for indicating the position of the scanner with respect to said stereoscopic image; and a tilt limit circuit coupled to the position indicating means for limiting the tilt of the scanner as a function of both horizontal position and tilt of the scanner.

8. An automatic stereomapping system comprising:

apparatus for projecting a stereoscopic image from a pair of separate related images of terrain which is to be reproduced photogrammetrically;

a scanner for automatically scanning a predetermined portion of the stereoscopic image;

transducers spaced in substantially parallel alignment with the separate related images for producing video signals in response to light passed by the scanner;

first means coupled to the transducers for controlling the elevation of the scanner relative to a reference plane representing a selected elevation in accordance with the projected image;

second means coupled to the transducers for controlling the tilt of the scanner in accordance with the projected image;

a scan interrupter for stopping the scanning process in the event of inadequate video signal correlation below a predetermined level as derived from the transducers;

a selector coupled to the transducers and controllable by the second means for selecting a preferred one of said video signals; and a printer coupled to the selector for providing at least an orthophoto derived from the selected signal.

9. An automatic stereomapping system comprising:

means for producing a stereoscopic image from a pair of separate related images of an area to be mapped;

a scanner;

a traverse mechanism for causing the scanner to traverse the stereoscopic image to be mapped in a predetermined pattern;

means spaced in substantially parallel alignment with the separate related images and responsive to light signals passed by the scanner as it moves in its traverse of the stereoscopic image for producing corresponding electrical signals;

means for correlating the corresponding electrical signals to develop error signals indicative of deviation in both elevation and angle of tilt of the scanner from the appropriate elevation and angle of tilt of the particular point in the stereoscopic image being scanned at a given instant;

control means coupled to the correlating means for automatically adjusting the position of the scanner in response to said error signals;

first print-out means responsive to at least one of the corresponding electrical signals for printing out an orthographic photograph of the scanned image;

a signal selector coupled between the light signal responsive means and the first print-out means for selecting the preferred corresponding electrical signal depending on the position of the scanner relative to the image;

second print-out means for producing a drop-line chart indicating the relative elevation of the scanner during its traversal of the stereoscopic image; and switching means coupled to the scanner for providing at least three levels of electrical signals in a selected sequence relative to the direction of elevation change for controlling the second print-out means.

10. An automatic stereomapping system comprising:

a scanner;

means for projecting a stereoscopic image from a pair of separate related images;

means for causing the scanner to traverse the projected image;

a pair of photomultiplier tubes spaced in substantially parallel alignment with the separate related images said photomultiplier tubes being movable with the scanner for developing respective video signals in accordance with light received during the scanning of the stereoscopic image;

error signal generating means coupled between the photomultiplier tubes and the scanner for controlling the height and tilt of the scanner relative to a reference plane representing a selected elevation during its traverse of the stereoscopic image;

a scan interrupter circuit for stopping the movement of the scanner upon the occurrence of at least one of two possible predetermined conditions;

means coupled to the photomultiplier tubes for triggering the scan interrupter circuit in the event that the degree of correlation of signals developed by the photomultiplier tubes falls below a predetermined threshold;

means coupled to the error signal generator for triggering the scan interrupter circuit when the height error signal exceeds a predetermined threshold; and means coupled respectively to the photomultiplier tubes and the scanner for printing a pair of photographs in the form of an orthographic projection of the scanned image and an altitude drop-line chart indicating the relative elevation of each point in the scanned image.

11. In an automatic stereomapping system, the combination comprising:

first apparatus means for defining a stereo field depicting a three dimensional surface to be analyzed;

line scanning apparatus for analyzing elemental portions of said stereo field in repetitive discrete separated line scans for obtaining video signals representative of said elemental portions, the video signals including disturbances therein due to the time separation between adjacent line scans;

compensating means constructed and arranged to derive compensating signals related to said video signals occurring during said line scans and to substitute these compensating signals for said disturbances occurring between line scans so as to produce compensated video outputs from said compensating means; and second apparatus means responsive to said compensated video outputs from said compensating means for controlling the effective relative position of said line scanning apparatus with respect to the position of said first apparatus means so as to keep said scanning apparatus in effective contact with the three dimensional surface depicted by said stereo field.

12. The automatic stereomapping system of claim 11, said system further comprising printing apparatus responsive to video signals from said line scanning apparatus and also responsive to said line scanning apparatus position control means to print an orthophoto corresponding to said selected portion of said stereo field.

13. In an automatic stereomapping system the combination comprising:

means for projecting a stereoscopic image from a pair of separate related images of an area to be mapped;

light scanner means for developing sequential line scans of selected incremental areas of the stereoscopic image;

a pair of transducers positioned in substantially parallel alignment with the separated related images to receive light output from the light scanner means for developing individual video signals in accordance therewith, said video signals exhibiting undesired transients between each pair of line scans;

a dead-time compensator coupled to the transducers for substantially eliminating the effect of said undesired transients present in said video signals by substituting for said undesired transients compensating signals related to the levels of said video signals occurring during said line scans so as to produce resulting outputs from said dead-time compensator which are comprised of said video signals during line scans and said compensating signals between line scans;

means coupled to respond to the dead-time compensator outputs for analysis thereof to develop error signals corresponding to the error in the elevational position of said light scanner means with respect to said stereoscopic image; and means coupled to the light scanner means and responsive to said error signals for adjusting the elevation of the light scanner means to substantially coincide with the elevation of the scanned incremental areas of the stereoscopic image.

14. In an automatic stereomapping system in accordance with claim 13 wherein the dead-time compensator further includes a circuit for developing a signal which is a function of the average level of the video signals produced during a line scan.

15. In an automatic mapping system the arrangement comprising:

apparatus for projecting a stereo image from a pair of separate related images;

a scanner including means for automatically scanning in an interrupted pattern a predetermined portion of the stereo image and to provide energy signals accordingly;

a pair of transducers spaced in relation to said scanner in substantially parallel alignment with the separate related images for producing electrical signals in response to said energy signals provided by the scanning means;

dead-time compensating means coupled to respond to said energy signals from said transducers for developing dead-time compensating signals which are a function of said energy signals developed during uninterrupted periods of said scanning of said portions and for substituting these compensating signals for said energy signals occurring during interrupted periods of said scanning so as to produce resulting outputs from said dead-time compensating means which comprise said energy signals during uninterrupted scanning periods and said compensating signals during interrupted scanning periods;

means to which the outputs of said dead-time compensating means are applied for providing a signal representative of an error of the relative position of said scanner with respect to the portion of the stereo image which is being scanned; and scanner elevation control means coupled to respond to said error signal to vary the elevation of said scanner so that it substantially coincides with the predetermined portion of the stereo image.

16. In an automatic mapping system of the type utilized to derive data related to images contained in a stereoscopic pair of photographs, the combination comprising:

scanning means for scanning a stereoscopic pair of photographs by scanning incremental areas thereof with a series of sequentially generated interrupted scanning lines in a predetermined traverse pattern and developing video signals corresponding thereto;

dead-time compensating means associated with said scanning means and responsive to said video signals therefrom for developing dead-time compensating signals related to the level of said video signals occurring during uninterrupted periods of said scanning and for substituting these compensating signals for said video signals occurring during interrupted periods of said scanning so as to produce resulting outputs from said dead-time compensating means which comprise said video signals during uninterrupted scanning periods and comprise said compensating signals during interrupted scanning periods;

means for detecting time displacements between corresponding portions of the outputs of said dead-time compensating means, so as to produce error signals as a function of time displacements therebetween; and means responsive to said error signals for varying the effective position of said scanning means with respect to a reference defined by said stereoscopic pair of photographs so as to minimize said time displacements between the outputs of said dead-time compensating means.

17. In an automatic mapping system for deriving data from a stereoscopic pair of photographs, the combination comprising:

scanning means for scanning a related pair of photographs by scanning incremental areas thereof with a predetermined series of disconnected substantially parallel lines in a predetermined traverse pattern and developing video signals corresponding to terrain imagery in said incremental areas scanned by said scanning means;

first means responsive to the video signals corresponding to terrain imagery in each of said scanned incremental areas for developing dead-time compensating signals related to the level of said video signals occurring during connected periods of said scanning and for substituting these compensating signals for said video signals occurring during disconnected periods of said scanning so as to produce resulting outputs from said first means which comprise said video signals during connected scanning periods and comprise said compensating signals during disconnected scanning periods;

second means for correlating the outputs of said first means so as to detect time displacements therebetween and thereby produce error signals as a function of said time displacements; and scanning means position control means coupled to said second means and responsive to said error signals for varying the position of said scanning means with respect to said related pair of photographs so as to minimize said time displacements.

18. An automatic stereomapping system comprising:

scanning means for scanning a stereoscopic pair of photographs by scanning incremental areas thereof with a series of sequentially generated disconnected lines in a predetermined traverse pattern and developing video signals corresponding thereto;

dead-time compensating means electrically coupled to said scanning means and responsive to said video signals for developing dead-time compensating signals related to the level of said video signals occurring during connected periods of said scanning and for substituting these compensating signals for said video signals occurring during disconnected periods of said scanning so as to produce resulting outputs from said dead-time compensating means which comprise said video signals during connected scanning periods and comprise said compensating signals during disconnected scanning periods;

means to which the outputs of said dead-time compensating means are supplied for comparison to detect time displacements between signals representing different scanned incremental areas and producing error signals as a function of said time displacements;

means coupled to respond to said error signals for varying the effective position of said scanning means with respect to said stereoscopic pair of photographs so as to minimize said time displacements; and means responsive to selected ones of said video signals corresponding to the scanned incremental areas of said stereoscopic pair of photographs for providing information representative of image elements, so as to provide a record in orthographic projection corresponding to said stereoscopic pair of photographs.

19. In an automatic mapping system wherein portions of a stereoscopic pair of photographs are scanned by scanning means so as to develop video signals corresponding to the imagery in said scanned portions and wherein said signals are compared to develop error signals indicative of the time deviation of information contained in said portions, said time deviation being indicative of errors in the position of said scanning means with respect to said stereoscopic pair of photographs, said system including:

means included in said scanning means for scanning said portions of a stereoscopic pair of photographs with an interrupted scanning pattern to obtain said video signals, said video signals including unwanted signals caused by the interruptions in said interrupted scanning pattern;

dead-time compensation means coupled to receive said video signals and respond thereto for developing dead-time compensating signals which are a function of said video signals developed during uninterrupted scanning periods of each of said portions and for substituting these compensating signals for said video signals occurring during interrupted scanning periods so as to produce resulting ouptuts from said dead-time compensation means which comprise said video signals during uninterrupted scanning periods and comprise said compensating signals during interrupted scanning periods; and correlating means coupled to receive the outputs from said dead-time compensation means to develop error signals as a function of time deviations therebetween.

References Cited

UNITED STATES PATENTS

| | | |
|---|---|---|
| 3,145,303 | 8/1964 | Hobrough. |
| 3,246,560 | 4/1960 | Birnbaum et al. |

JEWELL H. PEDERSON, Primary Examiner

ORVILLE B. CHEW II, Assistant Examiner

U.S. Cl. X.R.

250—220